(12) United States Patent
Kang et al.

(10) Patent No.: US 12,638,128 B2
(45) Date of Patent: May 26, 2026

(54) BRACKET DEVICE

(71) Applicant: Chicony Electronics Co., Ltd., New Taipei City (TW)

(72) Inventors: Wei Xun Kang, New Taipei City (TW); Pei-Sheng Tsai, New Taipei City (TW)

(73) Assignee: Chicony Electronics Co., Ltd., New Taipei City (TW)

( * ) Notice: Subject to any disclaimer, the term of this patent is extended or adjusted under 35 U.S.C. 154(b) by 10 days.

(21) Appl. No.: 18/751,366

(22) Filed: Jun. 24, 2024

(65) Prior Publication Data

US 2025/0251081 A1 Aug. 7, 2025

(30) Foreign Application Priority Data

Feb. 2, 2024 (TW) .................................. 113104306

(51) Int. Cl.
F16M 11/38 (2006.01)
F16M 11/22 (2006.01)

(52) U.S. Cl.
CPC ............. F16M 11/22 (2013.01); F16M 11/38 (2013.01); F16M 2200/08 (2013.01)

(58) Field of Classification Search
CPC .............. F16M 11/38; F16M 11/2007; F16M 11/2014; F16M 11/242
USPC ............ 248/163.1, 431, 166, 167, 168, 170; 403/78, 83, 84, 85, 86, 97, 98, 111, 114, 403/119, 120, 164
See application file for complete search history.

(56) References Cited

U.S. PATENT DOCUMENTS

| | | | | |
|---|---|---|---|---|
| 587,896 | A | * | 8/1897 | White |
| 4,541,597 | A | * | 9/1985 | Davanture ............. F16M 11/42 248/172 |
| 4,614,452 | A | * | 9/1986 | Wang ...................... F16C 11/10 403/97 |
| 6,419,198 | B1 | * | 7/2002 | Einav ..................... F16M 11/38 248/346.03 |
| 7,236,354 | B2 | * | 6/2007 | Hsu ...................... F16M 11/242 361/679.07 |
| 9,949,565 | B1 | * | 4/2018 | Huang ................... A47B 91/00 |
| 11,930,920 | B1 | * | 3/2024 | Moore ................ A47B 3/0803 |
| 2022/0316649 | A1 | * | 10/2022 | Tang ...................... F16M 11/10 |

FOREIGN PATENT DOCUMENTS

| | | |
|---|---|---|
| CN | 207599296 U | 7/2018 |
| CN | 217684203 U | 10/2022 |

* cited by examiner

*Primary Examiner* — Alfred J Wujciak
(74) *Attorney, Agent, or Firm* — CKC & Partners Co., LLC

(57) ABSTRACT

A bracket device includes a supporting bracket, a leg assembly, and a fixing member. The leg assembly is connected to the supporting bracket along an axis and includes a first leg and a second leg. The first leg has a plurality of first tooth-like structures. The first tooth-like structures are located around the axis on a side of the first leg facing the supporting bracket. The second leg is disposed between the supporting bracket and the first leg and has a plurality of second tooth-like structures. The second tooth-like structures are located around the axis on a side of the second leg facing the first leg and are engaged with the first tooth-like structures. The fixing member sequentially passes through the first leg and the second leg along the axis and is fixed to the supporting bracket.

14 Claims, 18 Drawing Sheets

$120\begin{cases} 121 \\ 122 \\ 123 \end{cases}$

100

121

A

121a

G1

122

123

110

A

111a

G6

111

BRACKET DEVICE

CROSS-REFERENCE TO RELATED APPLICATION

This application claims priority to Taiwan Application Serial Number 113104306, filed Feb. 2, 2024, which is herein incorporated by reference.

BACKGROUND

Technical Field

The disclosure relates to a bracket device.

Description of Related Art

Nowadays, many objects use brackets or legs to form the bottom support structure so that they can be placed upright on the ground for use. These objects include electric fans, floor lamps, tables, chairs, musical instrument stands, microphone stands, flagpoles, and etc. Taking a bracket as an example, it mainly has an upright pole and a base assembled at the bottom of the upright pole. The upright pole and the base are detachable components and are usually packed into s carton in a separated state in order to reduce the volume of the carton and facilitate inventory and transportation, thereby reducing the economic costs of inventory and transportation. Subsequently, consumers can perform simple assembly work by themselves.

However, although the upright pole and the base of the existing bracket can be disassembled, at most the upright pole and the base can only be separated, and the base cannot be disassembled again, which cannot completely overcome the above-mentioned problems. In addition, the upright pole and the base are usually connected using snaps, so they can only be fixed at a certain angle, and the angle of the base cannot be adjusted due to space. Furthermore, the base usually only has two legs, so the stability is slightly insufficient.

Accordingly, how to provide a bracket device to solve the aforementioned problems becomes an important issue to be solved by those in the industry.

SUMMARY

An aspect of the disclosure is to provide a bracket device that can efficiently solve the aforementioned problems.

According to an embodiment of the disclosure, a bracket device includes a supporting bracket, a leg assembly, and a fixing member. The leg assembly is connected to the supporting bracket along an axis and includes a first leg and a second leg. The first leg has a plurality of first tooth-like structures. The first tooth-like structures are located around the axis on a side of the first leg facing the supporting bracket. The second leg is disposed between the supporting bracket and the first leg and has a plurality of second tooth-like structures. The second tooth-like structures are located around the axis on a side of the second leg facing the first leg and are engaged with the first tooth-like structures. The fixing member sequentially passes through the first leg and the second leg along the axis and is fixed to the supporting bracket.

In an embodiment of the disclosure, one of the first leg and the second leg has a guiding block. Another of the first leg and the second leg has a guiding groove. The guiding block is slidably sleeved at an inner edge of the guiding groove.

In an embodiment of the disclosure, the first leg includes a housing, a sliding block, and a resilient member. The housing has an accommodating space and an opening communicated with each other. The sliding block is accommodated in the accommodating space and configured to move along the axis. The first tooth-like structures are located at a side of the sliding block adjacent to the opening. The opening is configured for the first tooth-like structures to pass out of the housing. The resilient member is accommodated in the accommodating space and disposed at a side of the sliding block away from the opening.

In an embodiment of the disclosure, the first leg further includes a buffer pad. The buffer pad is disposed at and in contact with the side of the first leg facing the supporting bracket and the side of the second leg facing the first leg.

In an embodiment of the disclosure, the second leg further has a plurality of third tooth-like structures. The third tooth-like structures are located around the axis on a side of the second leg facing the supporting bracket. The bracket device further includes a third leg. The third leg is disposed between the supporting bracket and the second leg and has a plurality of fourth tooth-like structures. The fourth tooth-like structures are located around the axis on a side of the third leg facing the second leg and are engaged with the third tooth-like structures. The fixing member sequentially passes through the first leg, the second leg, and the third leg and is fixed to the supporting bracket.

In an embodiment of the disclosure, one of the second leg and the third leg has a guiding block. Another of the second leg and the third leg has a guiding groove. The guiding block is slidably sleeved at an inner edge of the guiding groove.

In an embodiment of the disclosure, the second leg includes a housing, a sliding block, and a resilient member. The housing has an accommodating space and an opening communicated with each other. The sliding block is accommodated in the accommodating space and configured to move along the axis. The third tooth-like structures are located at a side of the sliding block adjacent to the opening. The opening is configured for the third tooth-like structures to pass out of the housing. The resilient member is accommodated in the accommodating space and disposed at a side of the sliding block away from the opening.

In an embodiment of the disclosure, the second leg further includes a buffer pad. The buffer pad is disposed at and in contact with the side of the second leg facing the supporting bracket and the side of the third leg facing the second leg.

In an embodiment of the disclosure, the third leg further has a plurality of fifth tooth-like structures. The fifth tooth-like structures are located around the axis on a side of the third leg facing the supporting bracket. The supporting bracket has a plurality of sixth tooth-like structures. The sixth tooth-like structures are located around the axis on a side of the supporting bracket facing the third leg and engaged with the fifth tooth-like structures.

In an embodiment of the disclosure, one of the third leg and the supporting bracket has a guiding block. Another of the third leg and the supporting bracket has a guiding groove. The guiding block is slidably sleeved at an inner edge of the guiding groove.

In an embodiment of the disclosure, the third leg includes a housing, a sliding block, and a resilient member. The housing has an accommodating space and an opening communicated with each other. The sliding block is accommodated in the accommodating space and configured to move along the axis. The fifth tooth-like structures are located at a side of the sliding block adjacent to the opening. The opening is configured for the fifth tooth-like structures to pass out of the housing. The resilient member is accommodated in the accommodating space and disposed at a side of the sliding block away from the opening.

In an embodiment of the disclosure, the third leg further includes a buffer pad. The buffer pad is disposed at and in contact with the side of the third leg facing the supporting bracket and the side of the supporting bracket facing the third leg.

In an embodiment of the disclosure, at least one set of the first tooth-like structures, the second tooth-like structures, the third tooth-like structures, the fourth tooth-like structures, the fifth tooth-like structures, and the sixth tooth-like structures includes a plurality of groups.

In an embodiment of the disclosure, the first leg, the second leg, and the third leg extend away from the axis. One of the first leg, the second leg, and the third leg is located within an included angle between other two of the first leg, the second leg, and the third leg. The included angle is less than 180 degrees.

In an embodiment of the disclosure, the supporting bracket includes a first extending segment and a second extending segment. The first extending segment extends along the axis. The leg assembly is connected to an end of the first extending segment. The second extending segment is connected to another end of the first extending segment and extends away from the axis. One of the first leg, the second leg, and the third leg is substantially aligned with the second extending segment in a direction parallel to the axis.

According to an embodiment of the disclosure, a bracket device includes a supporting bracket and a leg assembly. The leg assembly is connected to the supporting bracket along an axis and includes a first leg and a second leg. The first leg has a plurality of first tooth-like structures. The first tooth-like structures are located around the axis on a side of the first leg facing the supporting bracket. The second leg is disposed between the supporting bracket and the first leg and has a plurality of second tooth-like structures. The second tooth-like structures are located around the axis on a side of the second leg facing the first leg and are engaged with the first tooth-like structures. The first leg includes a housing, a sliding block, and a resilient member. The housing has an accommodating space and an opening communicated with each other. The sliding block is accommodated in the accommodating space and configured to move along the axis. The first tooth-like structures are located at a side of the sliding block adjacent to the opening. The opening is configured for the first tooth-like structures to pass out of the housing. The resilient member is accommodated in the accommodating space and disposed at a side of the sliding block away from the opening.

Accordingly, in the bracket device of the disclosure, by engaging the tooth-like structures between the legs, the purpose of adjusting the angles between the legs can be achieved. By passing the fixing member sequentially through the legs and fixing to the supporting bracket, the legs with the adjusted angle can be secured. By disposing the guiding block and the guiding groove that are slidably fitting each other between the legs or between the legs and the supporting bracket, pre-assembly between the legs or between the legs and the supporting bracket can be performed before installing the fixing member. In some embodiments, the tooth-like structures can be sunk into the housing of the leg under pressure, thereby achieving the purpose of adjusting the angle between the legs without loosening the fixing member. By disposing the buffer pad between the legs or between the legs and the supporting bracket, the supporting stability and damping feeling during rotation can be optimized, and the shaking problem of the bracket device caused by the tolerance gap between components can be avoided.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
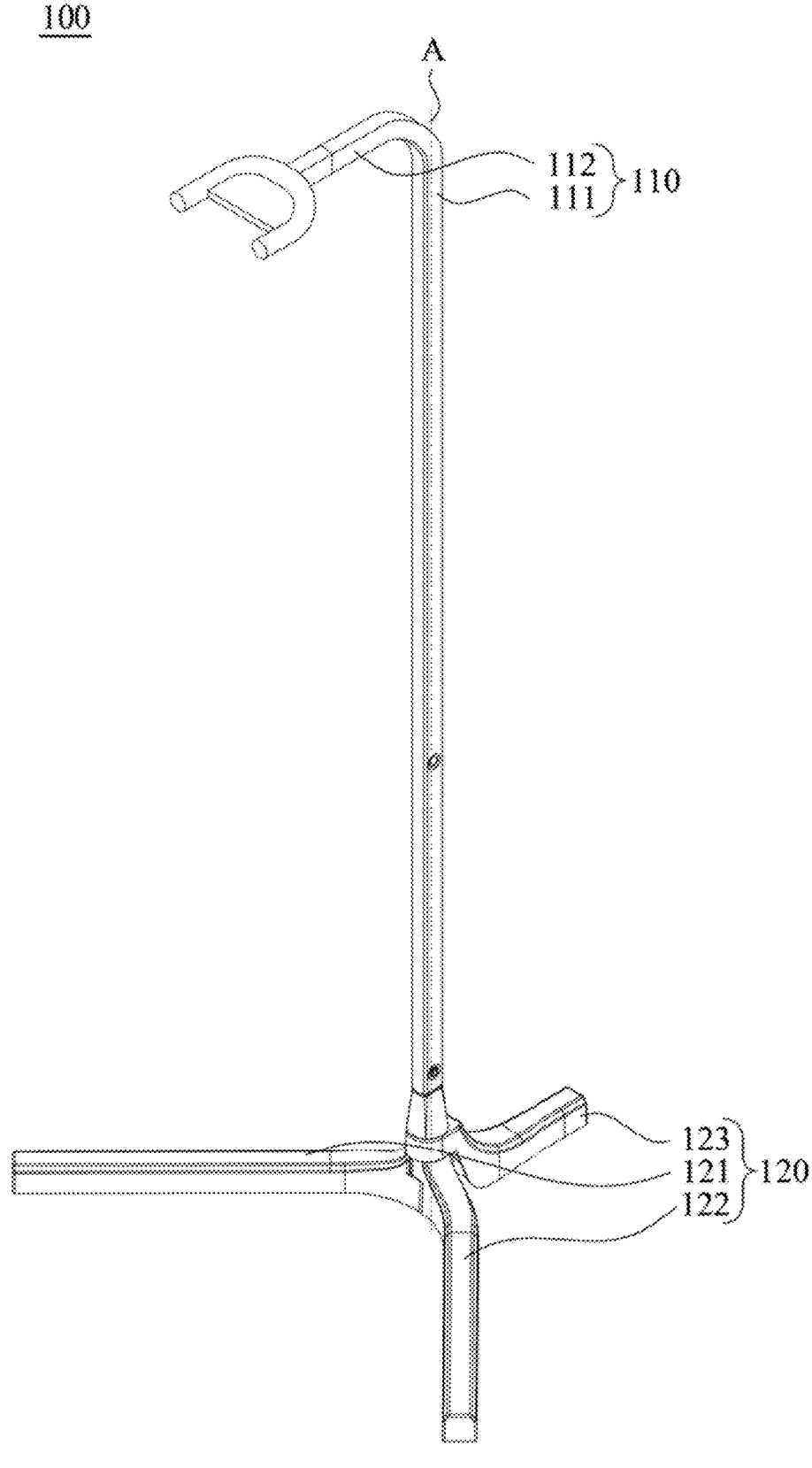
FIG. 1 is a perspective view of a bracket device according to an embodiment of the disclosure.

Reference will now be made in detail to the embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 2:
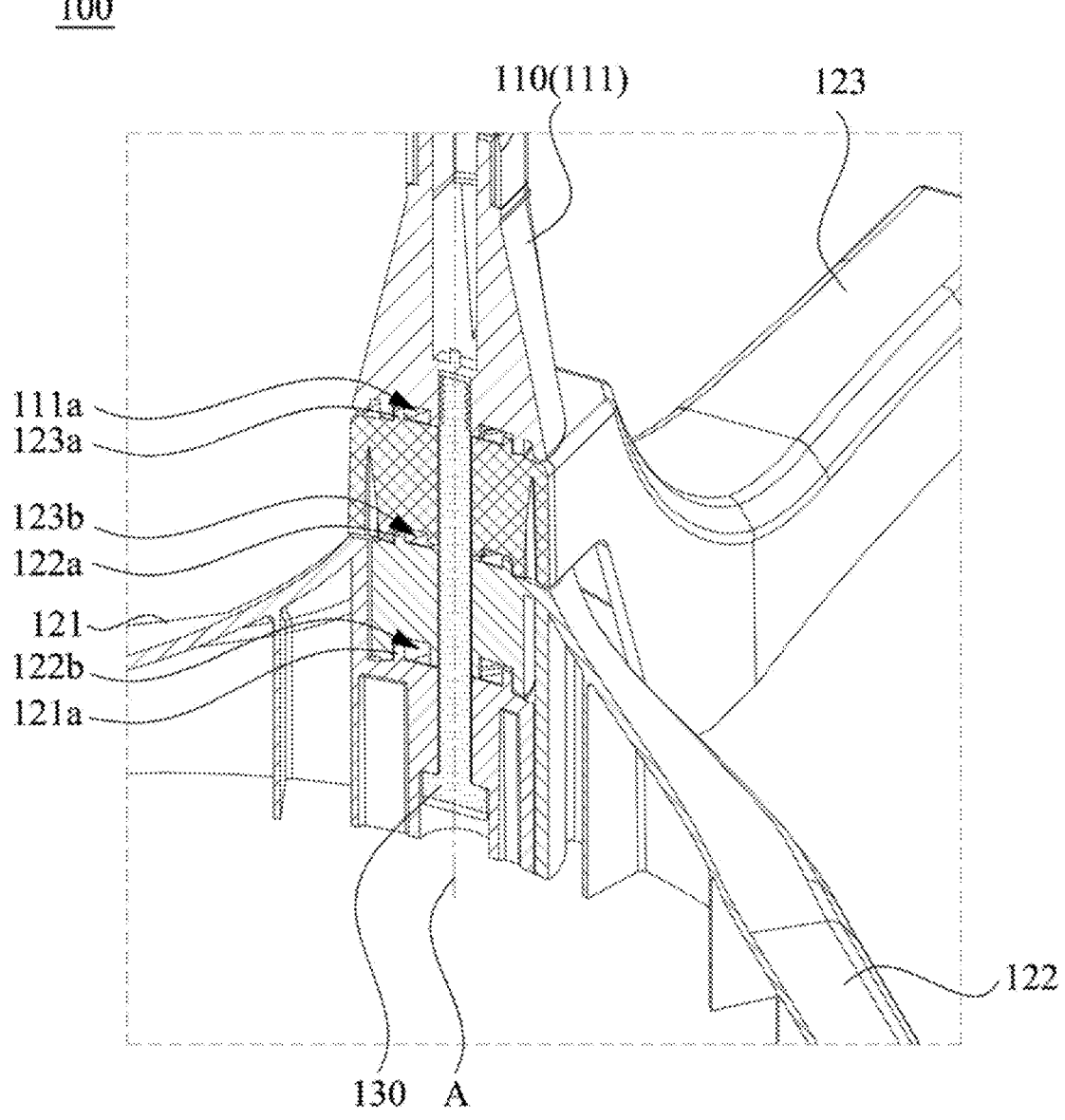
FIG. 2 is a partial perspective cross-sectional view of the bracket device in FIG. 1.

Reference is made to FIGS. 1 and 2. FIG. 1 is a perspective view of a bracket device 100 according to an embodiment of the disclosure. FIG. 2 is a partial perspective cross-sectional view of the bracket device 100 in FIG. 1. As shown in FIGS. 1 and 2, in the embodiment, the bracket device 100 includes a supporting bracket 110, a leg assembly 120, and a fixing member 130. The leg assembly 120 is connected to the supporting bracket 110 along an axis A and includes a first leg 121, a second leg 122, and a third leg 123. Each of the first leg 121, the second leg 122, and the third leg 123 includes an axis portion and a supporting portion. The axis portions of the first leg 121, the second leg 122, and the third leg 123 are fixed to each other and connected to the bottom of the supporting bracket 110. The supporting portions of the first leg 121, the second leg 122, and the third leg 123 extend outward relative to the axis portions and are located on the same plane. The second leg 122 is disposed between the first leg 121 and the third leg 123. The third leg 123 is disposed between the supporting bracket 110 and the second leg 122. The fixing member 130 sequentially passes through the first leg 121, the second leg 122, and the third leg 123 along the axis A and is fixed to the supporting bracket 110. In other words, the first leg 121, the second leg 122, and the third leg 123 are all sleeved on the fixing member 130. Therefore, each of the first leg 121, the second leg 122, and the third leg 123 can rotate through the fixing member 130 as a shaft. As shown in FIG. 1, the first leg 121, the second leg 122, and the third leg 123 extend in different directions away from the axis A to be firmly supported on a flat surface (such as the ground or a tabletop), so that the supporting bracket 110 connected to the leg assembly 120 can stand upright along the axis A.

As shown in FIG. 1, in the embodiment, the supporting bracket 110 includes a first extending segment 111 and a second extending segment 112. The first extending segment 111 extends along the axis A. The third leg 123 of the leg assembly 120 is connected to an end of the first extending segment 111 (i.e., the bottom end of the first extending segment 111 in FIG. 1). The second extending segment 112 is connected to another end of the first extending segment 111 (i.e., the top end of the first extending segment 111 in FIG. 1) and extends away from the axis A. An end of the second extending segment 112 away from the first extending segment 111 can be used to fix other objects. In some embodiments, the object fixed to the second extending segment 112 is, for example, a monitor, but the disclosure is not limited thereto. In other embodiments, the object fixed on the second extending segment 112 may be a lamp, a microphone, a fan, a toy, and etc.

In some other embodiments, the leg assembly 120 only includes the first leg 121 and the second leg 122 with the third leg 123 being omitted, and the supporting bracket 110 is directly fixed to a side of the second leg 122 away from the first leg 121. Correspondingly, since the fixing member 130 only needs to sequentially pass through the first leg 121 and the second leg 122 to be fixed to the supporting bracket 110, a model with a shorter length can be selected for the fixing member 130.

Figure 3:
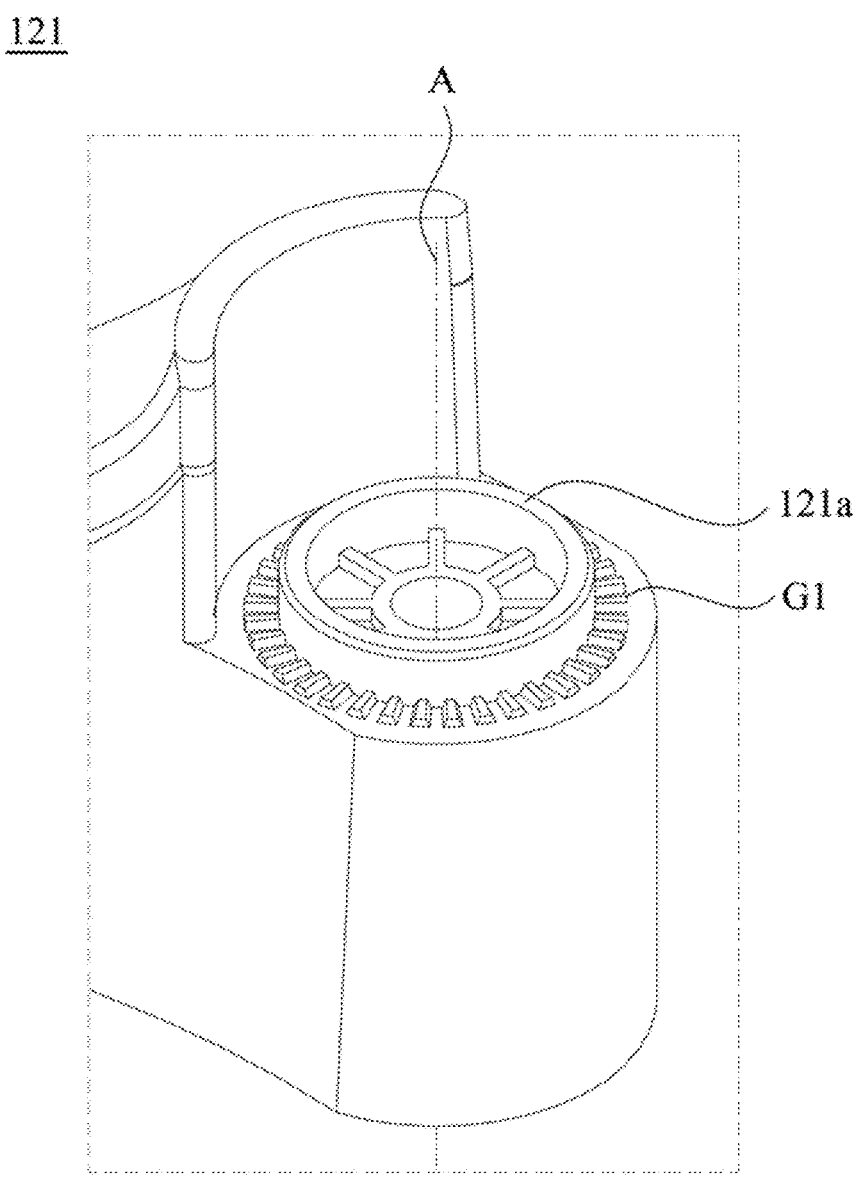
FIG. 3 is a partial perspective view of a first leg in FIG. 1.
Figure 4A:
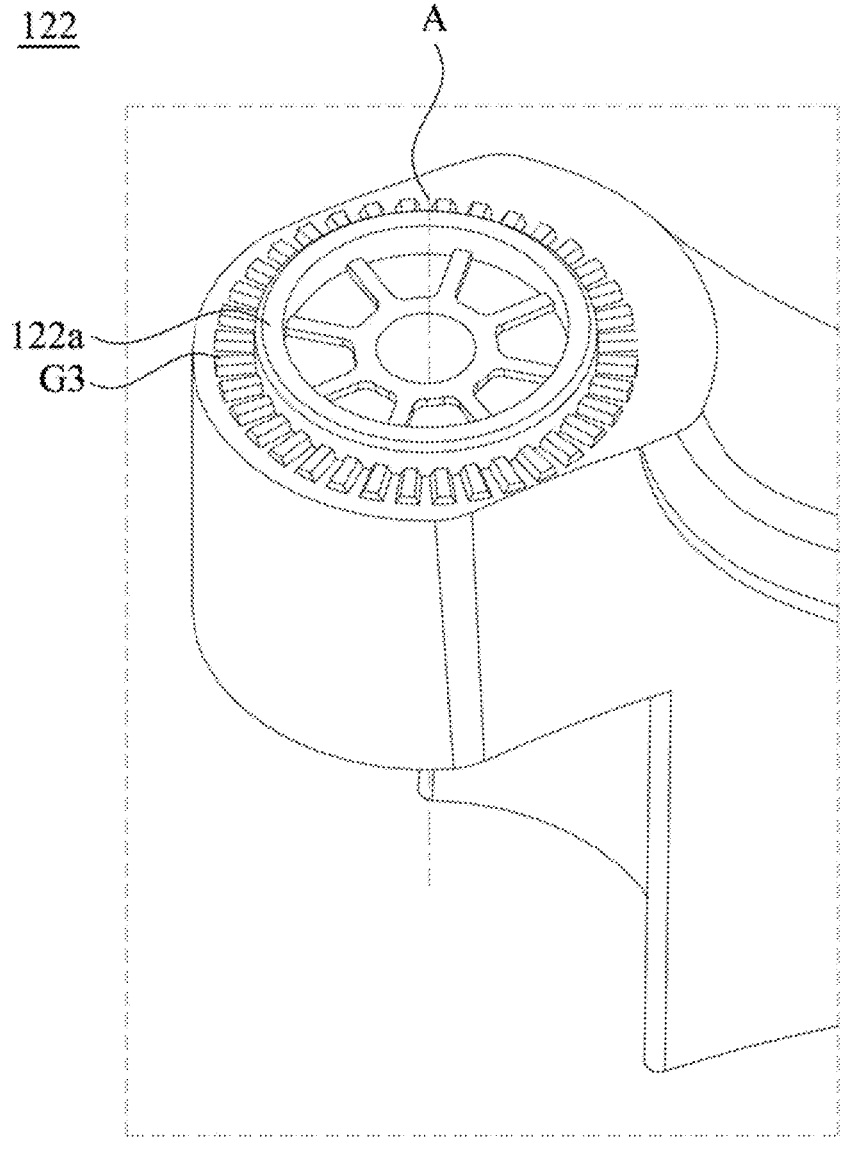
FIG. 4A is a partial perspective view of a second leg in FIG. 1.
Figure 4B:
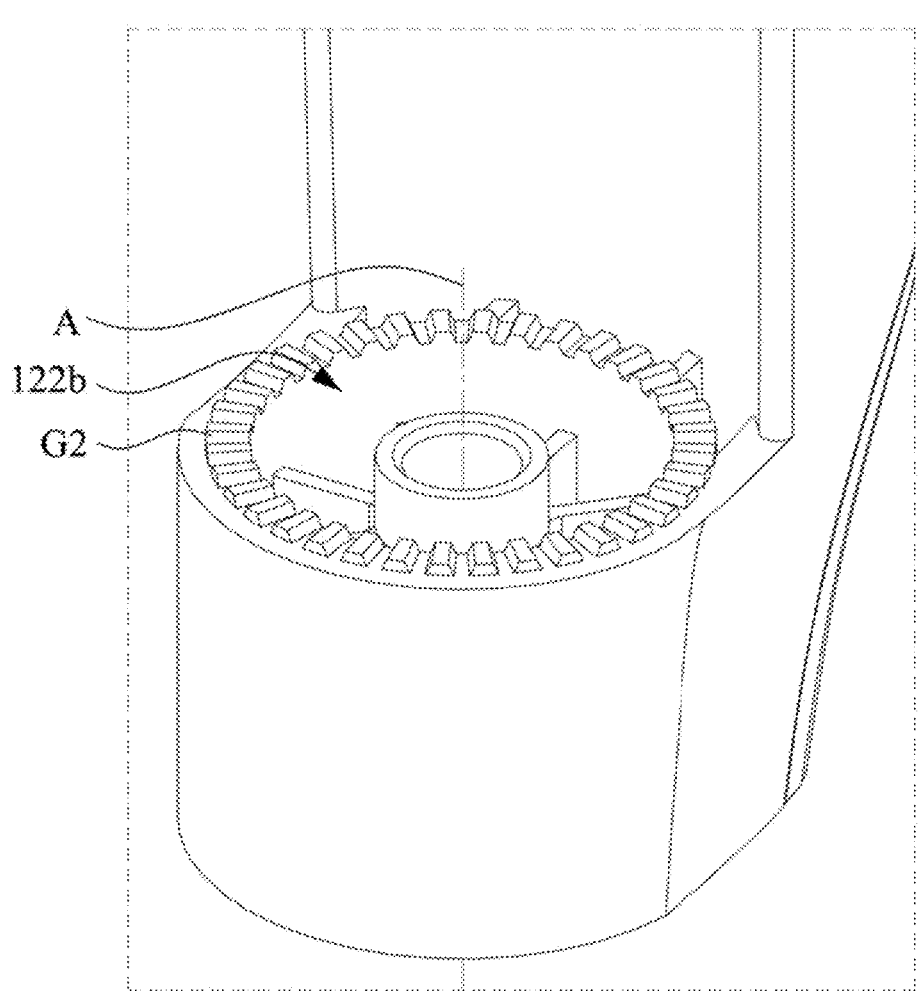
FIG. 4B is another partial perspective view of the second leg in FIG. 1.

Reference is made to FIG. 3, FIG. 4A, and FIG. 4B. FIG. 3 is a partial perspective view of the first leg 121 in FIG. 1. FIG. 4A is a partial perspective view of the second leg 122 in FIG. 1. FIG. 4B is another partial perspective view of the second leg 122 in FIG. 1. As shown in FIG. 3 and FIG. 4B with reference to FIG. 2, in the embodiment, the first leg 121 has a plurality of first tooth-like structures G1. The plurality of first tooth-like structures G1 are located around the axis A on a side of the first leg 121 facing the supporting bracket 110, and the plurality of first tooth-like structures G1 are spaced apart from each other. In other words, the plurality of first tooth-like structures G1 are arranged radially relative to the axis A. The second leg 122 is disposed between the supporting bracket 110 and the first leg 121 and has a plurality of second tooth-like structures G2. The plurality of second tooth-like structures G2 are located around the axis A on a side of the second leg 122 facing the first leg 121. The spacing between the plurality of second tooth-like structures G2 may be the same as the spacing between the plurality of first tooth-like structures G1, and the plurality of second tooth-like structures G2 are engaged with the plurality of first tooth-like structures G1. In other words, the plurality of second tooth-like structures G2 are arranged radially relative to the axis A, and the plurality of first tooth-like structures G1 may correspondingly contact the plurality of second tooth-like structures G2 (i.e., the number of the plurality of first tooth-like structures G1 is the same as the number of the plurality of second tooth-like structures G2), but the disclosure is not limited thereto. By engaging the first tooth-like structures G1 of the first leg 121 and the second tooth-like structures G2 of the second leg 122 with each other, the purpose of adjusting the included angle between the first leg 121 and the second leg 122 can be achieved. In addition, by passing the fixing member 130 sequentially through the first leg 121, the second leg 122, and the third leg 123 and being fixed to the supporting bracket 110, the first leg 121 and the second leg 122 with the adjusted included angle can be fixed.

In practical applications, the plurality of first tooth-like structures G1 and the plurality of second tooth-like structures G2 can be engaged with each other if they have different tooth shapes or numbers of teeth. For example, a number of the plurality of second tooth-like structures G2 is less than a number of the plurality of first tooth-like structures G1 (i.e., the spacing between the plurality of second tooth-like structures G2 is greater than the spacing between the plurality of first tooth-like structures G1), and each of the second tooth-like structures G2 can exactly mesh between corresponding two of the first tooth-like structures G1.

As shown in FIG. 3 and FIG. 4B, in the embodiment, the first tooth-like structures G1 of the first leg 121 and the second tooth-like structures G2 of the second leg 122 are protruding structures. Any adjacent two of the protruding structures are formed with a recess therebetween. Each of the first tooth-like structures G1 is engaged with the recess between adjacent two of the second tooth-like structures G2, and each of the second tooth-like structures G2 is engaged with the recess between adjacent two of the first tooth-like structures G1. During the process of adjusting the included angle between the first leg 121 and the second leg 122, the user can feel a sense of step feedback through the contact between the first tooth-like structures G1 and the second tooth-like structures G2.

In other embodiments, one set of the first tooth-like structures G1 and the second tooth-like structures G2 are protruding structures, another set of the first tooth-like structures G1 and the second tooth-like structures G2 are concave structures, and each of the protruding structures and a corresponding one of the concave structures can be engaged with each other in a matching manner.

In some embodiments, a central angle between any adjacent two of the first tooth-like structures G1 and a central angle between any adjacent two of the second tooth-like structures G2 relative to the axis A are about 10 degrees (i.e., the number of the plurality of first tooth-like structures G1 and the number of the plurality of second tooth-like structures G2 are both 36), but the disclosure is not limited thereto and can be flexibly adjusted according to actual needs.

As shown in FIG. 3 and FIG. 4B with reference to FIG. 2, in the embodiment, the first leg 121 has a guiding block 121*a*. The guiding block 121*a* is located on a side of the first leg 121 facing the second leg 122, in which the guiding block 121*a* is an annular flange centered on the axis A. The second leg 122 has a guiding groove 122*b*. The guiding groove 122*b* is located on a side of the second leg 122 facing the first leg 121, in which the guiding groove 122*b* is an annular groove centered on the axis A. The guiding block 121*a* is slidably sleeved at an inner edge of the guiding groove 122*b*. In this way, the first leg 121 and the second leg 122 can rotate relative to each other based on the axis A, so that the first leg 121 and the second leg 122 can be pre-assembled before installing the fixing member 130. The guiding block 121*a* and the guiding groove 122*b* are used for mutual alignment. In addition, structures of the guiding block 121*a* and the guiding groove 122*b* of different shapes can also be formed according to forming methods, but the disclosure is not limited thereto.

Figure 5A:
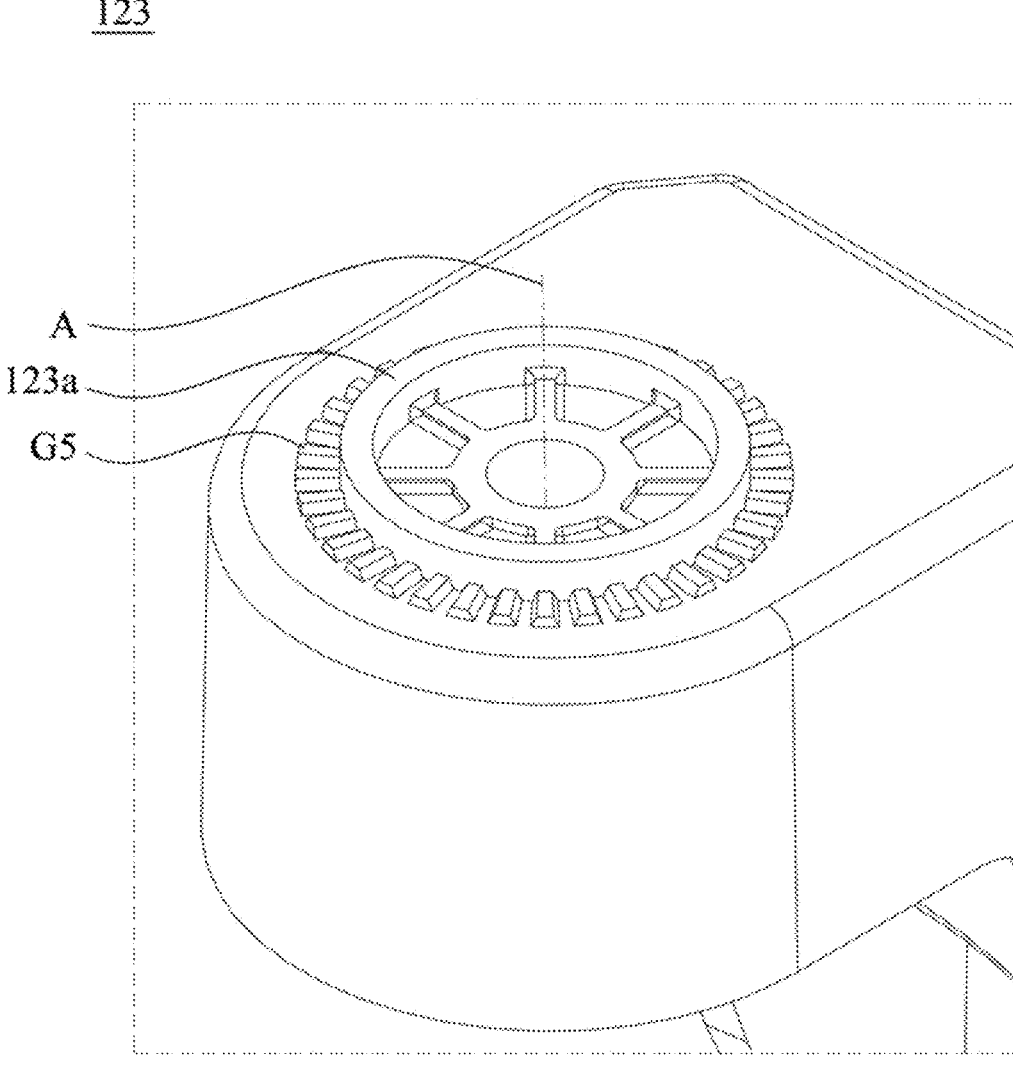
FIG. 5A is a partial perspective view of a third leg in FIG. 1.
Figure 5B:
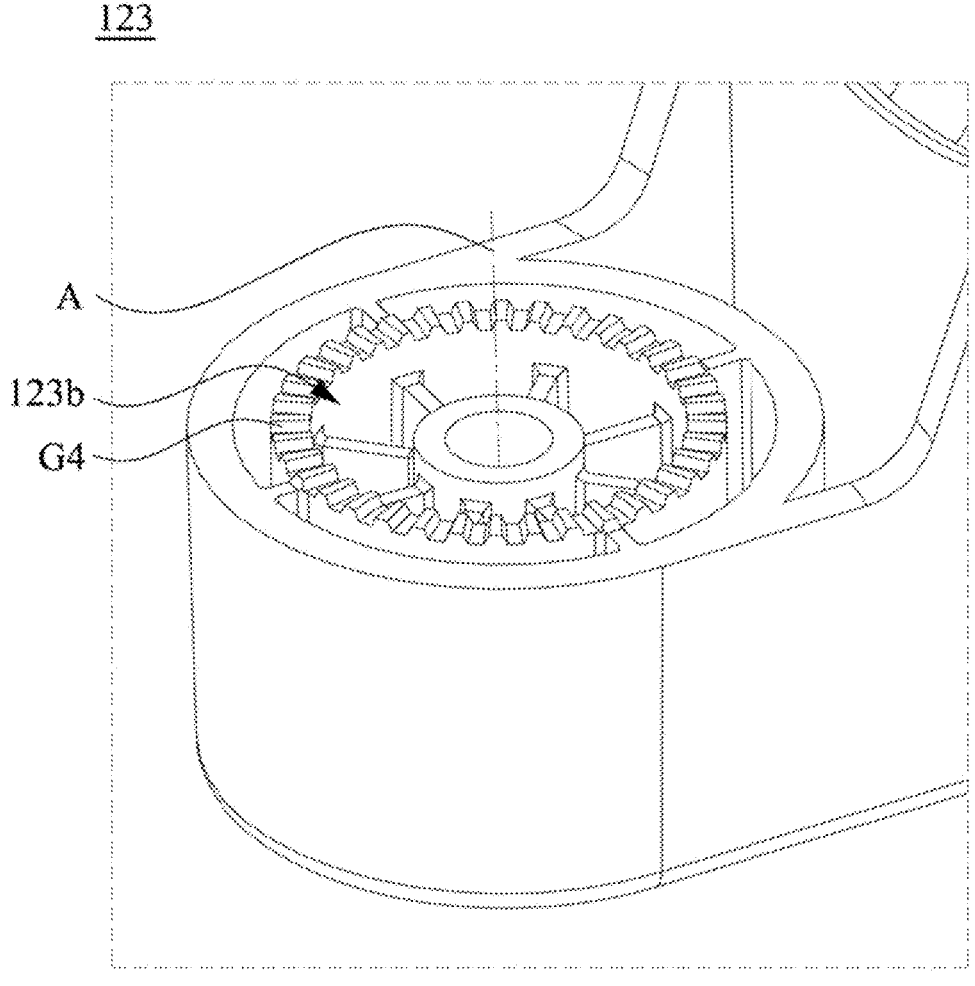
FIG. 5B is another partial perspective view of the third leg in FIG. 1.

Reference is made to FIG. 5A and FIG. 5B. FIG. 5A is a partial perspective view of the third leg 123 in FIG. 1. FIG. 5B is another partial perspective view of the third leg 123 in FIG. 1. As shown in FIG. 4A and FIG. 5B with reference to FIG. 2, in the embodiment, the second leg 122 further has a plurality of third tooth-like structures G3. The plurality of third tooth-like structures G3 are located around the axis A on a side of the second leg 122 facing the supporting bracket 110, and the plurality of third tooth-like structures G3 are spaced apart from each other. In other words, the plurality of third tooth-like structures G3 are arranged radially relative to the axis A. The third leg 123 has a plurality of fourth tooth-like structures G4. The plurality of fourth tooth-like structures G4 are located around the axis A on a side of the third leg 123 facing the second leg 122, and the plurality of fourth tooth-like structures G4 are engaged with the plurality of third tooth-like structures G3. In other words, the plurality of fourth tooth-like structures G4 are arranged radially relative to the axis A, and the plurality of third tooth-like structures G3 may correspondingly contact the plurality of fourth tooth-like structures G4 (i.e., the number of the plurality of third tooth-like structures G3 is the same as the number of the plurality of fourth tooth-like structures G4), but the disclosure is not limited thereto. By engaging the third tooth-like structures G3 of the second leg 122 and the fourth tooth-like structures G4 of the third leg 123 with each other, the purpose of adjusting the included angle between the second leg 122 and the third leg 123 can be achieved. In addition, by passing the fixing member 130 sequentially through the first leg 121, the second leg 122, and the third leg 123 and being fixed to the supporting bracket 110, the second leg 122 and the third leg 123 with the adjusted included angle can be fixed.

In practical applications, the plurality of third tooth-like structures G3 and the plurality of fourth tooth-like structures G4 can be engaged with each other if they have different tooth shapes or numbers of teeth. For example, a number of the plurality of fourth tooth-like structures G4 is less than a number of the plurality of third tooth-like structures G3 (i.e., the spacing between the plurality of fourth tooth-like structures G4 is greater than the spacing between the plurality of third tooth-like structures G3), and each of the fourth tooth-like structures G4 can exactly mesh between corresponding two of the third tooth-like structures G3.

As shown in FIG. 4A and FIG. 5B, in the embodiment, the third tooth-like structures G3 of the second leg 122 and the fourth tooth-like structures G4 of the third leg 123 are protruding structures. Any adjacent two of the protruding structures are formed with a recess therebetween. Each of the third tooth-like structures G3 is engaged with the recess between adjacent two of the fourth tooth-like structures G4, and each of the fourth tooth-like structures G4 is engaged with the recess between adjacent two of the third tooth-like structures G3. During the process of adjusting the included angle between the second leg 122 and the third leg 123, the user can feel a sense of step feedback through the contact between the third tooth-like structures G3 and the fourth tooth-like structures G4.

In other embodiments, one set of the third tooth-like structures G3 and the fourth tooth-like structures G4 are protruding structures, another set of the third tooth-like structures G3 and the fourth tooth-like structures G4 are concave structures, and each of the protruding structures and a corresponding one of the concave structures can be engaged with each other in a matching manner.

In some embodiments, a central angle between any adjacent two of the third tooth-like structures G3 and a central angle between any adjacent two of the fourth tooth-like structures G4 relative to the axis A are about 10 degrees (i.e., the number of the plurality of third tooth-like structures G3 and the number of the plurality of fourth tooth-like structures G4 are both 36), but the disclosure is not limited thereto and can be flexibly adjusted according to actual needs.

As shown in FIG. 4A and FIG. 5B with reference to FIG. 2, in the embodiment, the second leg 122 has a guiding block 122*a*. The guiding block 122*a* is located on a side of the second leg 122 facing the third leg 123, in which the guiding block 122*a* is an annular flange centered on the axis A. The third leg 123 has a guiding groove 123*b*. The guiding groove 123*b* is located on a side of the third leg 123 facing the second leg 122, in which the guiding groove 123*b* is an annular groove centered on the axis A. The guiding block 122*a* is slidably sleeved at an inner edge of the guiding groove 123*b*. In this way, the second leg 122 and the third leg 123 can rotate relative to each other based on the axis A, so that the second leg 122 and the third leg 123 can be pre-assembled before installing the fixing member 130. The guiding block 122*a* and the guiding groove 123*b* are used for mutual alignment. In addition, structures of the guiding block 122*a* and the guiding groove 123*b* of different shapes can also be formed according to forming methods, but the disclosure is not limited thereto.

Figure 6:
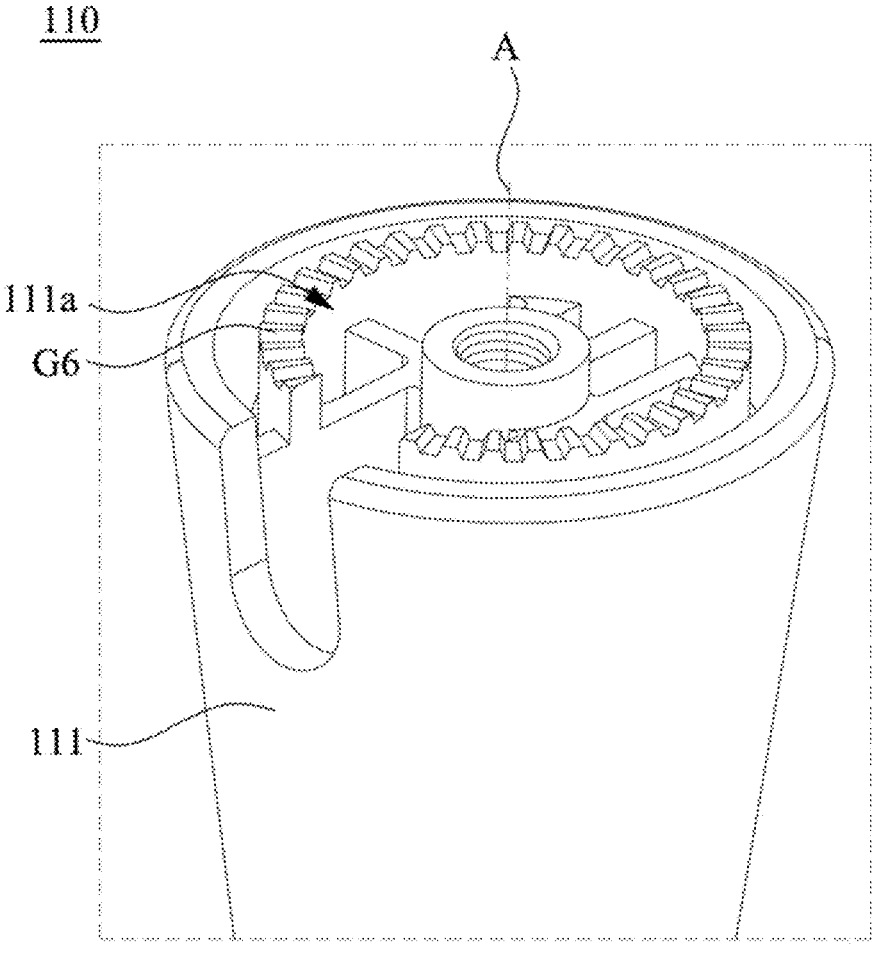
FIG. 6 is a partial perspective view of a supporting bracket in FIG. 1.

Reference is made to FIG. 6. FIG. 6 is a partial perspective view of the supporting bracket 110 in FIG. 1. As shown in FIG. 5A and FIG. 6 with reference to FIG. 2, in the embodiment, the third leg 123 further has a plurality of fifth tooth-like structures G5. The plurality of fifth tooth-like structures G5 are located around the axis A on a side of the third leg 123 facing the supporting bracket 110, and the plurality of fifth tooth-like structures G5 are spaced apart from each other. In other words, the plurality of fifth tooth-like structures G5 are arranged radially relative to the axis A. The supporting bracket 110 has a plurality of sixth tooth-like structures G6. The plurality of sixth tooth-like structures G6 are located around the axis A on a side of the supporting bracket 110 facing the third leg 123. The spacing between the plurality of sixth tooth-like structures G6 may be the same as the spacing between the plurality of fifth tooth-like structures G5, and the plurality of sixth tooth-like structures G6 are engaged with the plurality of fifth tooth-like structures G5. In other words, the plurality of sixth tooth-like structures G6 are arranged radially relative to the axis A, and the plurality of fifth tooth-like structures G5 may correspondingly contact the plurality of sixth tooth-like structures G6 (i.e., the number of the plurality of fifth tooth-like structures G5 is the same as the number of the plurality of sixth tooth-like structures G6), but the disclosure is not limited thereto. By engaging the fifth tooth-like structures G5 of the third leg 123 and the sixth tooth-like structures G6 of the supporting bracket 110 with each other, the purpose of adjusting the rotational orientation between the third leg 123 and the supporting bracket 110 can be achieved. In addition, by passing the fixing member 130 sequentially through the first leg 121, the second leg 122, and the third leg 123 and being fixed to the supporting bracket 110, the second leg 122 and the third leg 123 that have been adjusted can be fixed.

In practical applications, the plurality of fifth tooth-like structures G5 and the plurality of sixth tooth-like structures G6 can be engaged with each other if they have different tooth shapes or numbers of teeth. For example, a number of the plurality of sixth tooth-like structures G6 is less than a number of the plurality of fifth tooth-like structures G5 (i.e., the spacing between the plurality of sixth tooth-like structures G6 is greater than the spacing between the plurality of fifth tooth-like structures G5), and each of the sixth tooth-like structures G6 can exactly mesh between corresponding two of the fifth tooth-like structures G5.

As shown in FIG. 5A and FIG. 6, in the embodiment, the fifth tooth-like structures G5 of the third leg 123 and the sixth tooth-like structures G6 of the supporting bracket 110 are protruding structures. Any adjacent two of the protruding structures are formed with a recess therebetween. Each of the fifth tooth-like structures G5 is engaged with the recess between adjacent two of the sixth tooth-like structures G6, and each of the sixth tooth-like structures G6 is engaged with the recess between adjacent two of the fifth tooth-like structures G5. During the process of adjusting the rotational orientation between the third leg 123 and the supporting bracket 110, the user can feel a sense of step feedback through the contact between the fifth tooth-like structures G5 and the sixth tooth-like structures G6.

In other embodiments, one set of the fifth tooth-like structures G5 and the sixth tooth-like structures G6 are protruding structures, another set of the fifth tooth-like structures G5 and the sixth tooth-like structures G6 are concave structures, and each of the protruding structures and a corresponding one of the concave structures can be engaged with each other in a matching manner.

In some embodiments, a central angle between any adjacent two of the fifth tooth-like structures G5 and a central angle between any adjacent two of the sixth tooth-like structures G6 relative to the axis A are about 10 degrees (i.e., the number of the plurality of fifth tooth-like structures G5 and the number of the plurality of sixth tooth-like structures G6 are both 36), but the disclosure is not limited thereto and can be flexibly adjusted according to actual needs.

As shown in FIG. 5A and FIG. 6 with reference to FIG. 2, in the embodiment, the third leg 123 has a guiding block 123a. The guiding block 123a is located on a side of the third leg 123 facing the supporting bracket 110, in which the guiding block 123a is an annular flange centered on the axis A. The supporting bracket 110 has a guiding groove 111a. The guiding groove 111a is located on a side of the first extending segment 111 of the supporting bracket 110 facing the third leg 123, in which the guiding groove 111a is an annular groove centered on the axis A. The guiding block 123a is slidably sleeved at an inner edge of the guiding groove 111a. In this way, the third leg 123 and the supporting bracket 110 can rotate relative to each other based on the axis A, so that the third leg 123 and the supporting bracket 110 can be pre-assembled before installing the fixing member 130. The guiding block 123a and the guiding groove 111a are used for mutual alignment. In addition, structures of the guiding block 123a and the guiding groove 111a of different shapes can also be formed according to forming methods, but the disclosure is not limited thereto.

Figure 7:
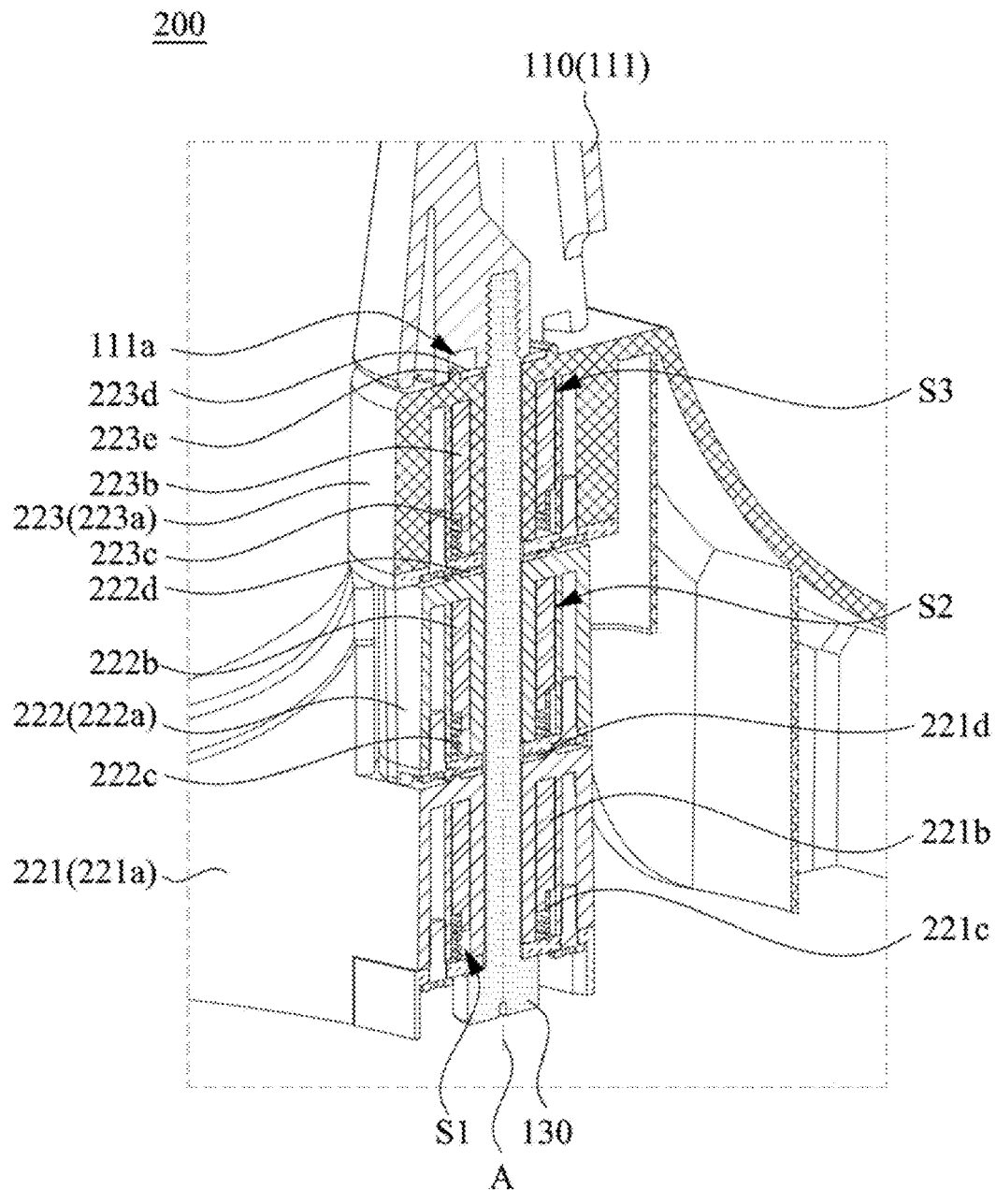
FIG. 7 is a partial perspective cross-sectional view of a bracket device according to another embodiment of the disclosure.

Reference is made to FIG. 7. FIG. 7 is a partial perspective cross-sectional view of a bracket device 200 according to another embodiment of the disclosure. As shown in FIG. 7, in the embodiment, the bracket device 200 includes a supporting bracket 110, a leg assembly 220, and a fixing member 130. The supporting bracket 110 and the fixing member 130 are the same as or similar to those of the embodiment shown in FIG. 1, so the structures and functions of these components can be referred to the relevant contents above and will not be described in detail here. The embodiment provides the modified leg assembly 220. The leg assembly 220 is connected to the supporting bracket 110 along an axis A and includes a first leg 221, a second leg 222, and a third leg 223. Each of the first leg 221, the second leg 222, and the third leg 223 includes an axis portion and a supporting portion. The axis portions of the first leg 221, the second leg 222, and the third leg 223 are fixed to each other and connected to the bottom of the supporting bracket 110. The supporting portions of the first leg 221, the second leg 222, and the third leg 223 extend outward relative to the axis portions and are located on the same plane. The second leg 222 is disposed between the first leg 221 and the third leg 223. The third leg 223 is disposed between the supporting bracket 110 and the second leg 222. The fixing member 130 sequentially passes through the first leg 221, the second leg 222, and the third leg 223 along the axis A and is fixed to the supporting bracket 110. In other words, the first leg 221, the second leg 222, and the third leg 223 are all sleeved on the fixing member 130. Therefore, each of the first leg 221, the second leg 222, and the third leg 223 can rotate through the fixing member 130 as a shaft. The first leg 221, the second leg 222, and the third leg 223 are configured to be firmly supported on a flat surface (such as the ground or a tabletop), so that the supporting bracket 110 connected to the leg assembly 220 can stand upright along the axis A.

Figure 8A:
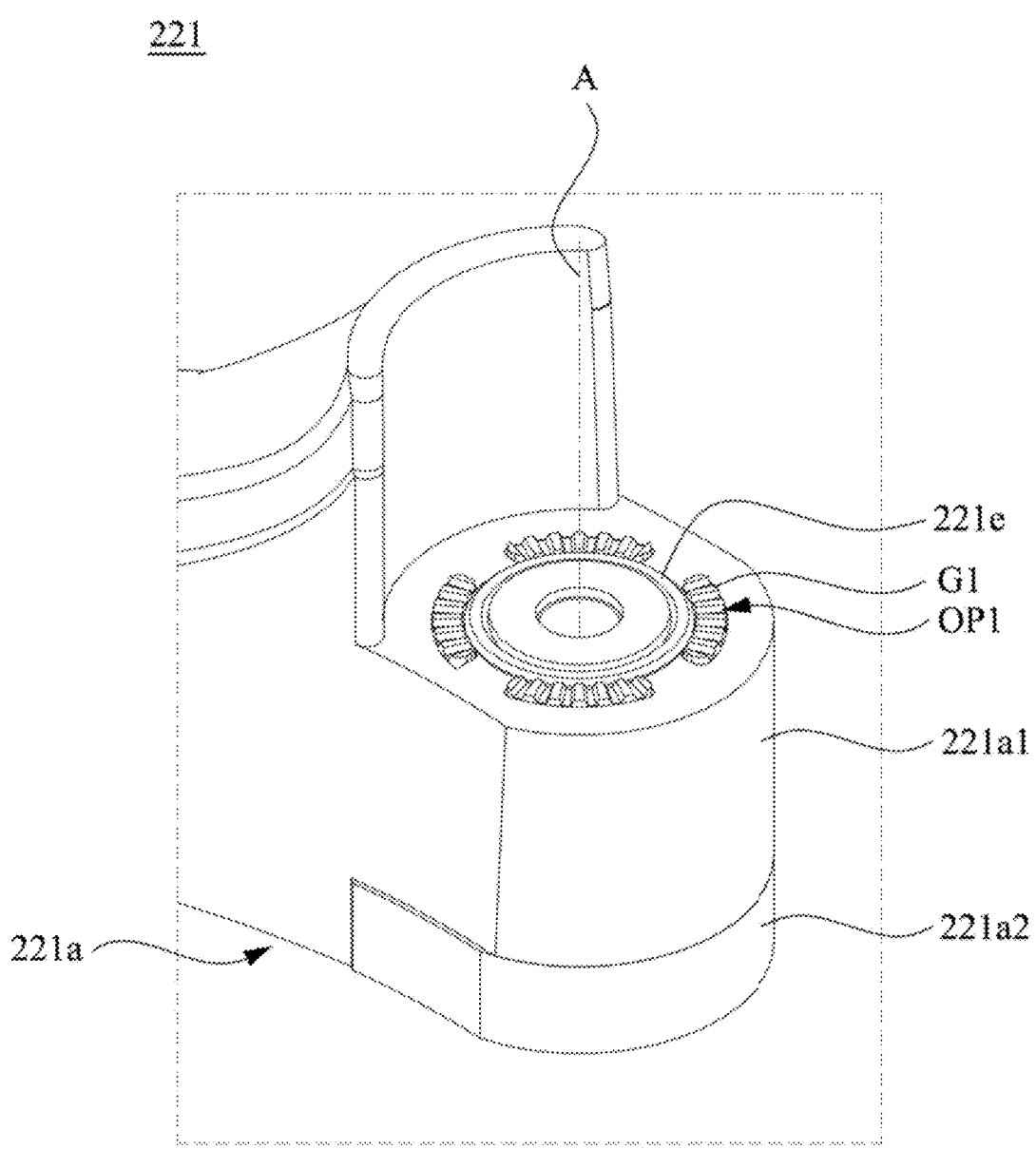
FIG. 8A is a partial perspective view of a first leg in FIG. 7.
Figure 8B:
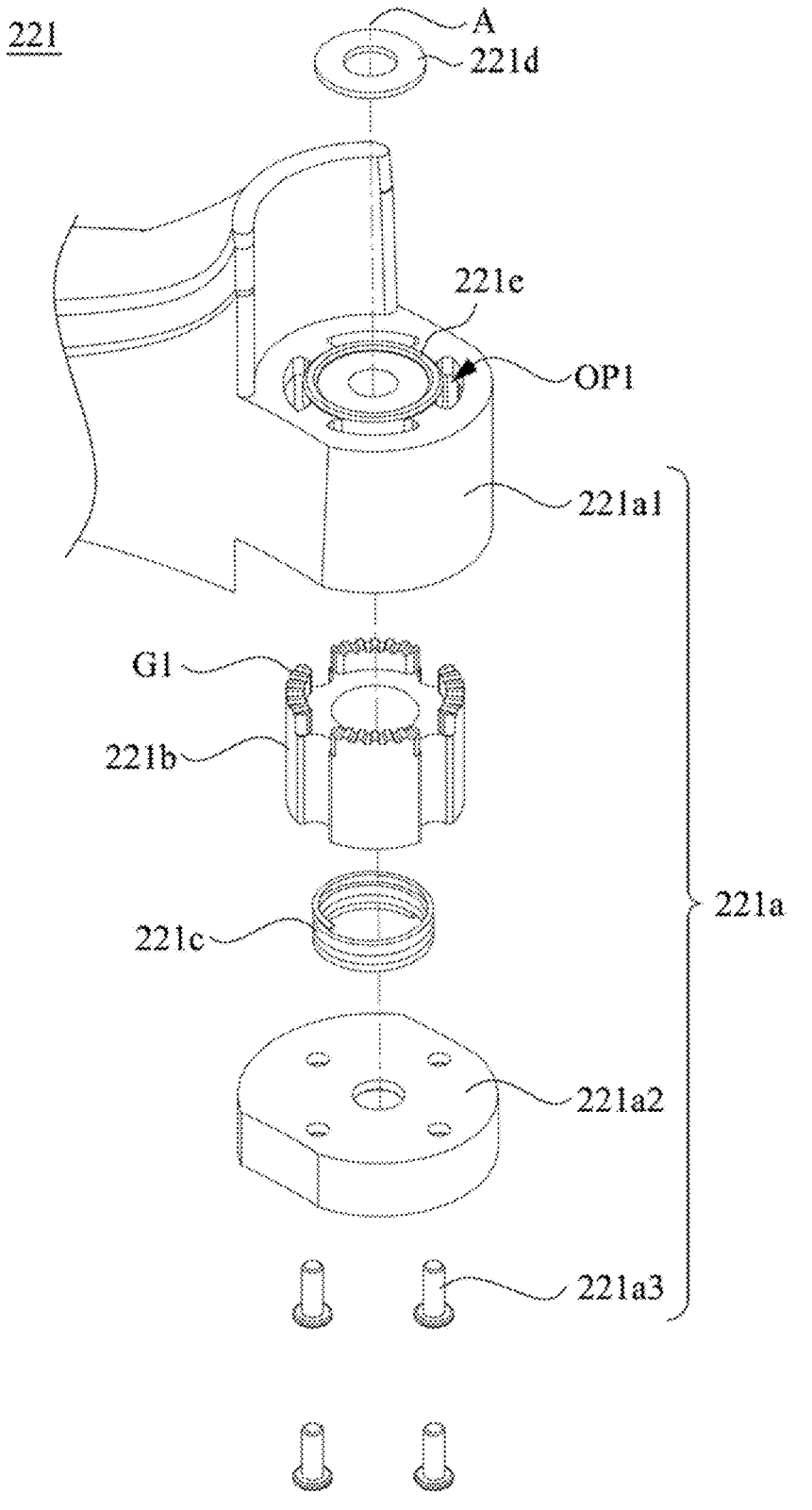
FIG. 8B is an exploded view of the first leg in FIG. 8A.
Figure 9A:
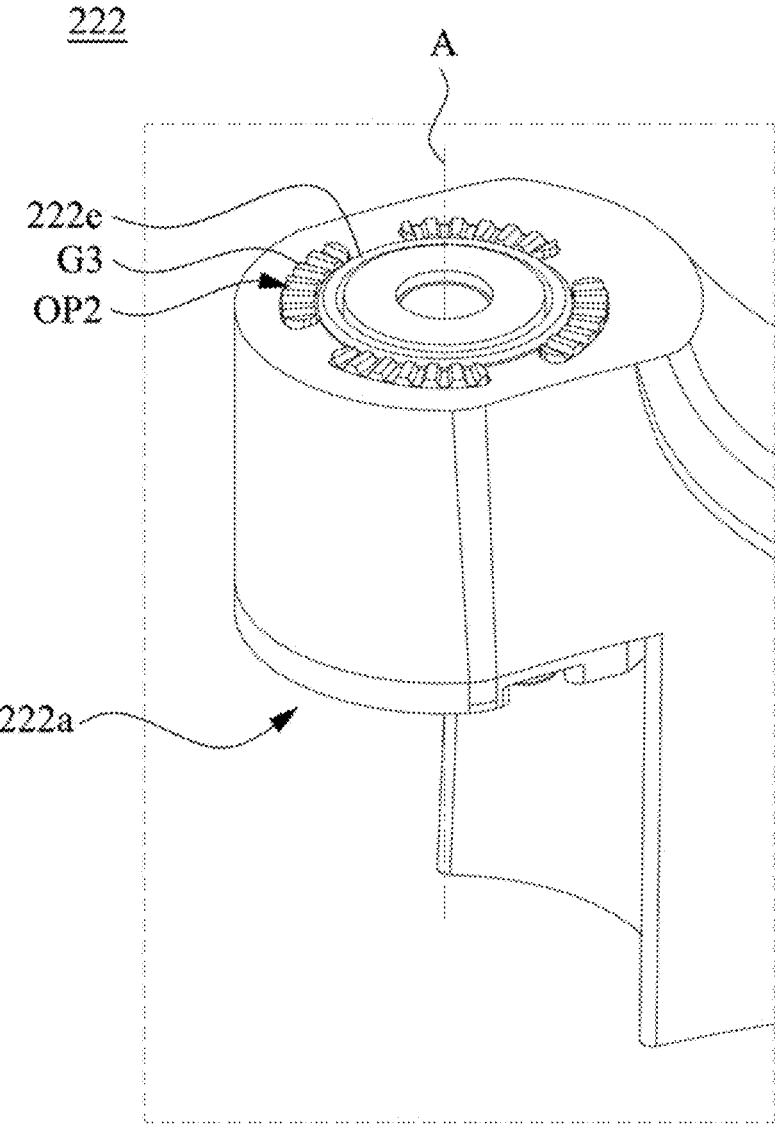
FIG. 9A is a partial perspective view of a second leg in FIG. 7.
Figure 9B:
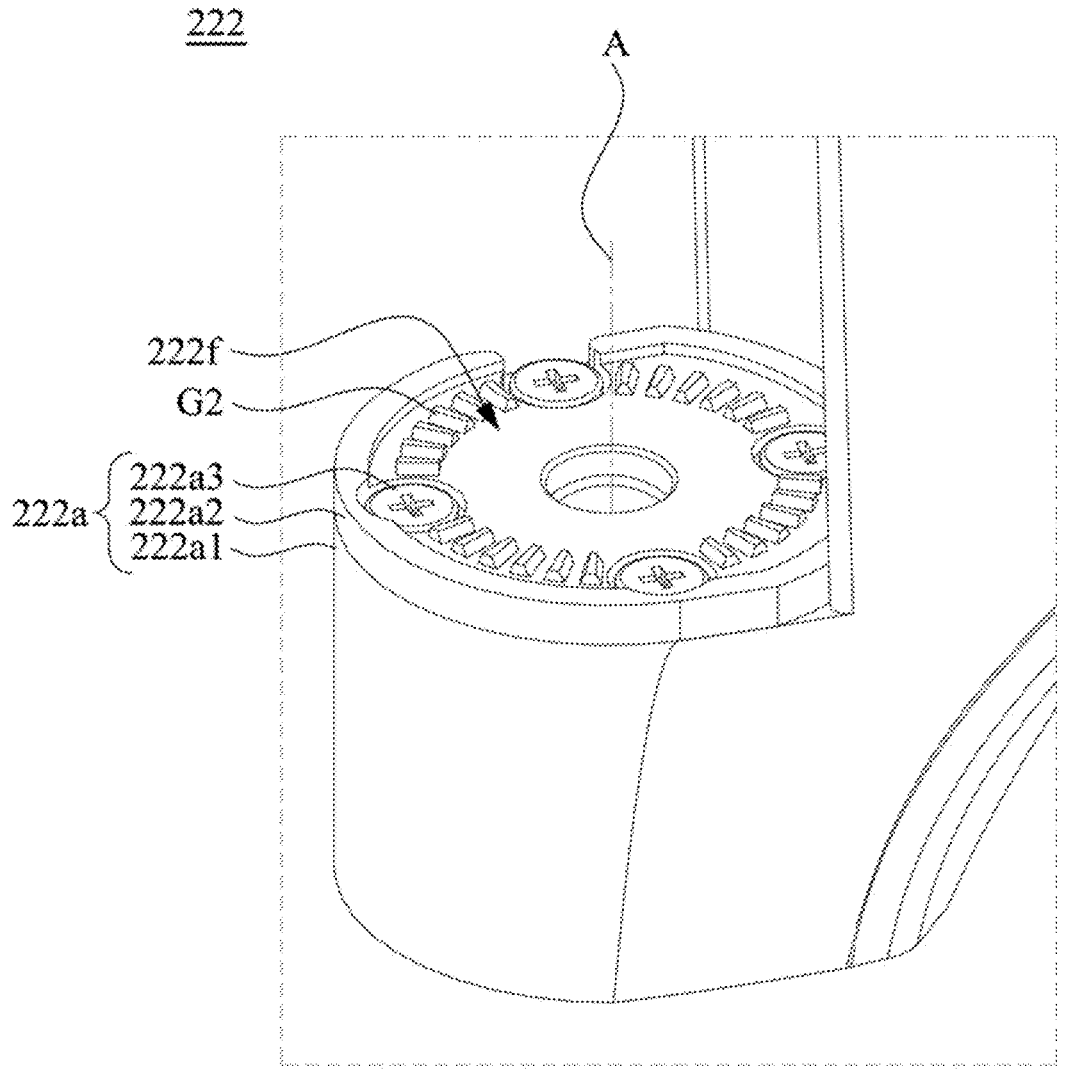
FIG. 9B is another partial perspective view of the second leg in FIG. 7.

Reference is made to FIG. 8A, FIG. 8B, FIG. 9A, and FIG. 9B. FIG. 8A is a partial perspective view of the first leg 221 in FIG. 7. FIG. 8B is an exploded view of the first leg 221 in FIG. 8A. FIG. 9A is a partial perspective view of the second leg 222 in FIG. 7. FIG. 9B is another partial perspective view of the second leg 222 in FIG. 7. As shown in FIG. 8A to FIG. 9B with reference to FIG. 7, in the embodiment, the first leg 221 has a plurality of first tooth-like structures G1. The plurality of first tooth-like structures G1 are located around the axis A on a side of the first leg 221 facing the supporting bracket 110. In other words, the plurality of first tooth-like structures G1 are arranged radially relative to the axis A. The second leg 222 is disposed between the supporting bracket 110 and the first leg 221 and has a plurality of second tooth-like structures G2. The plurality of second tooth-like structures G2 are located around the axis A on a side of the second leg 222 facing the first leg 221 and engaged with the plurality of first tooth-like structures G1. In other words, the plurality of second tooth-like structures G2 are arranged radially relative to the axis A.

By engaging the first tooth-like structures G1 of the first leg 221 and the second tooth-like structures G2 of the second leg 222 with each other, the purpose of adjusting the included angle between the first leg 221 and the second leg 222 can be achieved. In addition, by passing the fixing member 130 sequentially through the first leg 221, the second leg 222, and the third leg 223 and being fixed to the supporting bracket 110, the first leg 221 and the second leg 222 with the adjusted included angle can be fixed. During the process of adjusting the included angle between the first leg 221 and the second leg 222, the user can feel a sense of step feedback through the contact between the first tooth-like structures G1 and the second tooth-like structures G2.

As shown in FIG. 8A and FIG. 9B, in the embodiment, the first tooth-like structures G1 of the first leg 221 and the second tooth-like structures G2 of the second leg 222 are protruding structures. Any adjacent two of the protruding structures is formed with a concave structure therebetween. Each of the first tooth-like structures G1 is engaged with the recess between adjacent two of the second tooth-like structures G2, and each of the second tooth-like structures G2 is engaged with the recess between adjacent two of the first tooth-like structures G1. In other embodiments, one set of the first tooth-like structures G1 and the second tooth-like structures G2 are protruding structures, another set of the first tooth-like structures G1 and the second tooth-like structures G2 are concave structures, and each of the protruding structures and a corresponding one of the concave structures can be engaged with each other in a matching manner.

As shown in FIG. 8A and FIG. 8B, in the embodiment, a plurality of first tooth-like structures G1 are located on the top of a sliding block 221b. The first tooth-like structures G1 are divided into four groups, for example. The spacing between any adjacent two of the groups is greater than the spacing between any adjacent two of the first tooth-like structures G1 in each of the groups. That is, the first tooth-like structures G1 are not configured with a full number of teeth. As shown in FIG. 9B, in the embodiment, the second tooth-like structures G2 are divided into four groups, for example. The spacing between any adjacent two of the groups is greater than the spacing between any adjacent two of the second tooth-like structures G2 in each of the groups. That is, the second tooth-like structures G2 are not configured with a full number of teeth.

In some embodiments, a central angle between any adjacent two of the first tooth-like structures G1 and a central angle between any adjacent two of the second tooth-like structures G2 relative to the axis A are about 10 degrees, but the disclosure is not limited thereto and can be flexibly adjusted according to actual needs. As mentioned above, due to the non-full tooth number configuration, the number of the plurality of first tooth-like structures G1 is, for example, 28 as shown in FIG. 8A, and the number of the plurality of second tooth-like structures G2 is, for example, 24 as shown in FIG. 9B, but the disclosure is not limited thereto.

Furthermore, as shown in FIG. 8A and FIG. 8B, in the embodiment, the first leg 221 includes a housing 221a, the sliding block 221b, and a resilient member 221c. The housing 221a has an accommodating space S1 (referred to FIG. 7) and an opening OP1 communicated with each other. The sliding block 221b is accommodated in the accommodating space S1 and configured to move along the axis A. The first tooth-like structures G1 are located at a side of the sliding block 221b adjacent to the opening OP1. The opening OP1 is configured for the first tooth-like structures G1 to pass out of the housing 221a. The resilient member 221c is accommodated in the accommodating space S1 and disposed at a side of the sliding block 221b away from the opening OP1. With the structural configurations, when the first leg 221 and the second leg 222 rotate relative to each other based on the axis A, a second tooth-like structure G2 originally engaged in the recess between two of the first tooth-like structures G1 will press the first tooth-like structure G1 on one side and thus make the first tooth-like structures G1 sink into the opening OP1 without protruding out of the housing 221a. At this time, the sliding block 221b will move away from the opening OP1 and compress the resilient member 221c. After the second tooth-like structure G2 passes over the compressed first tooth-like structure G1, the resilient member 221c will elastically recover and push the sliding block 221b toward the opening OP1, which causes the first tooth-like structures G1 to reset and protrude out of the housing 221a through the opening OP1 and allows the second tooth-like structure G2 to engage with the next recess. In this way, the bracket device 200 of the embodiment can achieve the purpose of adjusting the included angle between the first leg 221 and the second leg 222 without loosening the fixing member 130.

As shown in FIG. 8B with reference to FIG. 7, in the embodiment, the housing 221a of the first leg 221 includes a main body 221a1, a cover 221a2, and a plurality of fixing members 221a3. The opening OP1 is located on one side of the main body 221a1. The other side of the main body 221a1 has a groove. The cover 221a2 covers the other side of the main body 221a1 to form the accommodation space S1 with the groove. The second tooth-like structures G2 are located on the cover 221a2, but the disclosure is not limited thereto. The fixing members 221a3 are configured to fix the cover 221a2 to the main body 221a1. An outer edge of the sliding block 221b may correspondingly form clearance spaces for the fixing members 221a3 to pass. The clearance spaces extend along the axis A to the plurality of first tooth-like structures G1, so that the plurality of first tooth-like structures G1 are divided into the plurality of groups. Therefore, the overall volume of the first leg 221 can be effectively reduced. In practical applications, the clearance spaces do not extend to the plurality of first tooth-like structures G1, so as to be similar to the full number teeth configuration as shown by the embodiment in FIG. 3. As shown in FIG. 8B with reference to FIG. 7, in the embodiment, the first leg 221 further includes a buffer pad 221d. The buffer pad 221d is disposed at and in contact with the side of the first leg 221 facing the supporting bracket 110 and the side of the second leg 222 facing the first leg 221. The buffer pad 221d can optimize the supporting stability and damping feeling when the first leg 221 and the second leg 222 rotate relative to each other, and avoid the shaking problem of the bracket device 200 due to the tolerance gap between the first leg 221 and the second leg 222.

As shown in FIG. 8A and FIG. 9B, in the embodiment, the first leg 221 has a guiding block 221e. The guiding block 221e is located on a side of the first leg 221 facing the second leg 222, in which the guiding block 221e is an annular flange centered on the axis A. The second leg 222 has a guiding groove 222f. The guiding groove 222f is located on a side of the second leg 222 facing the first leg 221, in which the guiding groove 222f is an annular groove centered on the axis A. The guiding block 221e is slidably sleeved at an inner edge of the guiding groove 222f. In this way, the first leg 221 and the second leg 222 can rotate relative to each other based on the axis A, so that the first leg 221 and the second leg 222 can be pre-assembled before installing the fixing member 130. The guiding block 221e and the guiding groove 222*f* are used for mutual alignment. In addition, structures of the guiding block 221*e* and the guiding groove 222*f* of different shapes can also be formed according to forming methods, but the disclosure is not limited thereto.

Figure 9C:
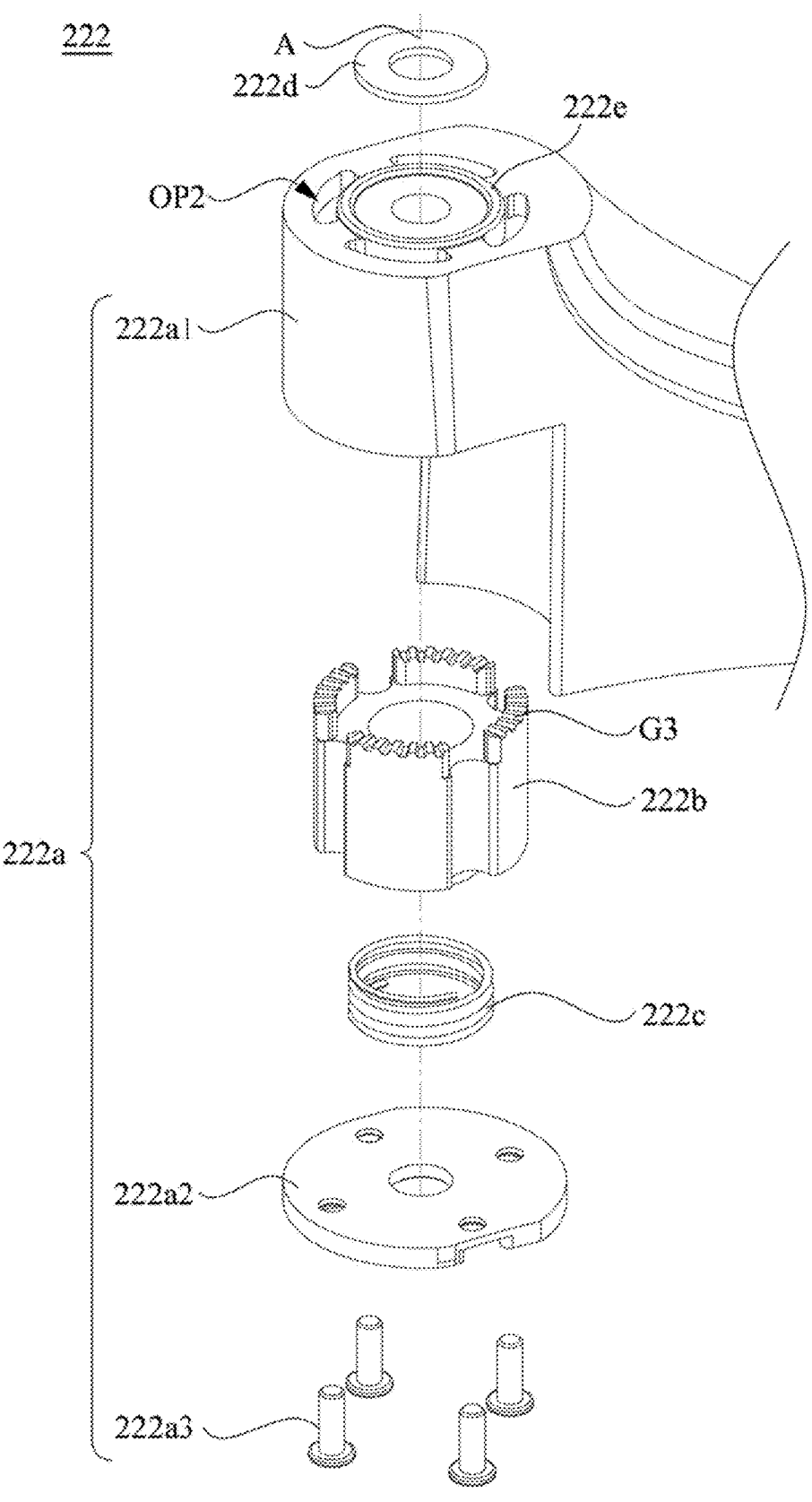
FIG. 9C is an exploded view of the second leg in FIG. 9A.
Figure 10A:
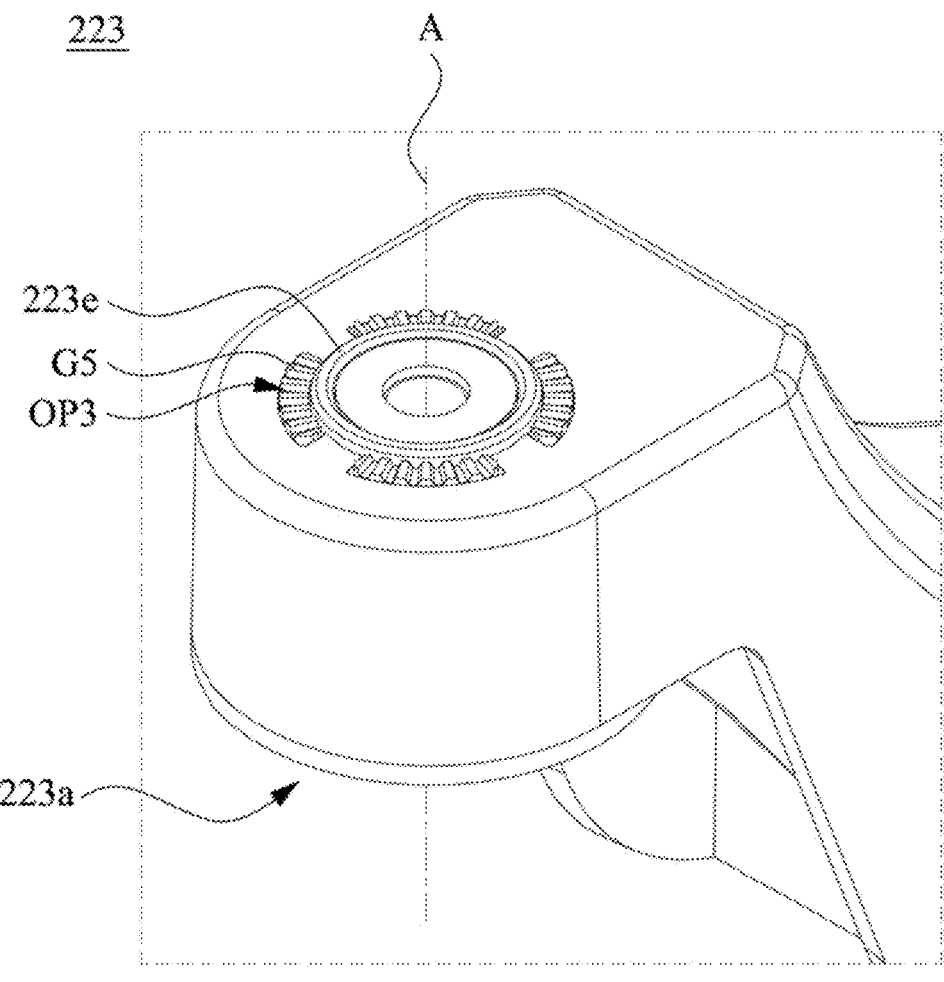
FIG. 10A is a partial perspective view of a third leg in FIG. 7.
Figure 10B:
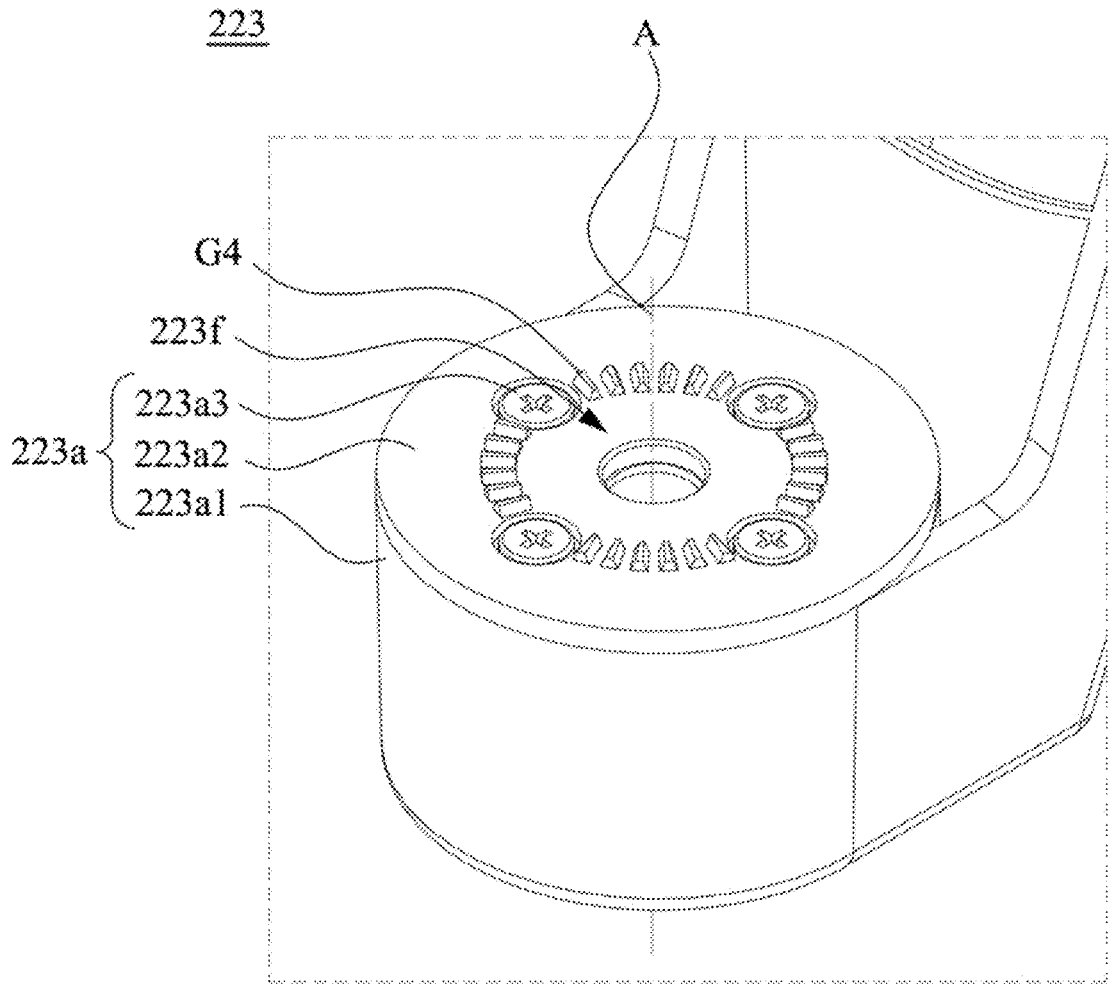
FIG. 10B is another partial perspective view of the third leg in FIG. 7.

Reference is made to FIG. 9C, FIG. 10A, and FIG. 10B. FIG. 9C is an exploded view of the second leg 222 in FIG. 9A. FIG. 10A is a partial perspective view of the third leg 223 in FIG. 7. FIG. 10B is another partial perspective view of the third leg 223 in FIG. 7. As shown in FIG. 9A to FIG. 10B with reference to FIG. 7, in the embodiment, the second leg 222 has a plurality of third tooth-like structures G3. The plurality of third tooth-like structures G3 are located around the axis A on a side of the second leg 222 facing the supporting bracket 110. In other words, the plurality of third tooth-like structures G3 are arranged radially relative to the axis A. The third leg 223 has a plurality of fourth tooth-like structures G4. The plurality of fourth tooth-like structures G4 are located around the axis A on a side of the third leg 223 facing the second leg 222 and engaged with the plurality of third tooth-like structures G3. In other words, the plurality of fourth tooth-like structures G4 are arranged radially relative to the axis A. By engaging the third tooth-like structures G3 of the second leg 222 and the fourth tooth-like structures G4 of the third leg 223 with each other, the purpose of adjusting the included angle between the second leg 222 and the third leg 223 can be achieved. In addition, by passing the fixing member 130 sequentially through the first leg 221, the second leg 222, and the third leg 223 and being fixed to the supporting bracket 110, the second leg 222 and the third leg 223 with the adjusted included angle can be fixed.

As shown in FIG. 9A and FIG. 10B, in the embodiment, the second leg 222 has a guiding block 222*e*. The structure of the guiding block 222*e* can be referred to the guiding block 221*e* in FIG. 8A and the above related descriptions, and will not be described in detail here. The third leg 223 has a guiding groove 223*f*. The structure of the guiding groove 223*f* can be referred to the guiding groove 222*f* in FIG. 9B and the above related descriptions, and will not be described again here. The guiding block 222*e* is slidably sleeved at an inner edge of the guiding groove 223*f*. In this way, the second leg 222 and the third leg 223 can rotate relative to each other based on the axis A, so that the second leg 222 and the third leg 223 can be pre-assembled before installing the fixing member 130.

As shown in FIG. 9A and FIG. 10B, in the embodiment, the third tooth-like structures G3 of the second leg 222 and the fourth tooth-like structures G4 of the third leg 223 are protruding structures, but the disclosure is not limited thereto. In other embodiments, one set of the third tooth-like structures G3 and the fourth tooth-like structures G4 are protruding structures, another set of the third tooth-like structures G3 and the fourth tooth-like structures G4 are concave structures, and each of the protruding structures and a corresponding one of the concave structures can be engaged with each other in a matching manner.

In some embodiments, a central angle between any adjacent two of the third tooth-like structures G3 and a central angle between any adjacent two of the fourth tooth-like structures G4 relative to the axis A are about 10 degrees, but the disclosure is not limited thereto and can be flexibly adjusted according to actual needs.

Furthermore, as shown in FIG. 9A and FIG. 9C, in the embodiment, the second leg 222 includes a housing 222*a*, the sliding block 222*b*, and a resilient member 222*c*. The housing 222*a* has an accommodating space S2 (referred to FIG. 7) and an opening OP2 communicated with each other.

The sliding block 222*b* is accommodated in the accommodating space S2 and configured to move along the axis A. The third tooth-like structures G3 are located at a side of the sliding block 222*b* adjacent to the opening OP2. The opening OP2 is configured for the third tooth-like structures G3 to pass out of the housing 222*a*. The resilient member 222*c* is accommodated in the accommodating space S2 and disposed at a side of the sliding block 222*b* away from the opening OP2. With the structural configurations, when the second leg 222 and the third leg 223 rotate relative to each other based on the axis A, a fourth tooth-like structure G4 originally engaged in the recess between two of the third tooth-like structures G3 will press the third tooth-like structure G3 on one side and thus make the third tooth-like structures G3 sink into the opening OP2 without protruding out of the housing 222*a*. At this time, the sliding block 222*b* will move away from the opening OP2 and compress the resilient member 222*c*. After the fourth tooth-like structure G4 passes over the compressed third tooth-like structure G3, the resilient member 222*c* will elastically recover and push the sliding block 222*b* toward the opening OP2, which causes the third tooth-like structures G3 to reset and protrude out of the housing 222*a* through the opening OP2 and allows the fourth tooth-like structure G4 to engage with the next recess. In this way, the bracket device 200 of the embodiment can achieve the purpose of adjusting the included angle between the second leg 222 and the third leg 223 without loosening the fixing member 130.

As shown in FIG. 9C with reference to FIG. 7, in the embodiment, the housing 222*a* of the second leg 222 includes a main body 222*a*1, a cover 222*a*2, and a plurality of fixing members 222*a*3. The opening OP2 is located on one side of the main body 222*a*1. The other side of the main body 222*a*1 has a groove. The cover 222*a*2 covers the other side of the main body 222*a*1 to form the accommodation space S2 with the groove. The fixing members 222*a*3 are configured to fix the cover 222*a*2 to the main body 222*a*1. An outer edge of the sliding block 222*b* may correspondingly form clearance spaces for the fixing members 222*a*3 to pass. The clearance spaces extend along the axis A to the plurality of third tooth-like structures G3, so that the plurality of third tooth-like structures G3 are divided into a plurality of groups. Therefore, the overall volume of the second leg 222 can be effectively reduced. In practical applications, the clearance spaces do not extend to the plurality of third tooth-like structures G3, so as to be similar to the full number teeth configuration as shown by the embodiment in FIG. 4A.

As shown in FIG. 9C with reference to FIG. 7, in the embodiment, the second leg 222 further includes a buffer pad 222*d*. The buffer pad 222*d* is disposed at and in contact with the side of the second leg 222 facing the supporting bracket 110 and the side of the third leg 223 facing the second leg 222. The buffer pad 222*d* can optimize the supporting stability and damping feeling when the second leg 222 and the third leg 223 rotate relative to each other, and avoid the shaking problem of the bracket device 200 due to the tolerance gap between the second leg 222 and the third leg 223.

It should be noted that the arrangement and number of the third tooth-like structures G3 in FIG. 9A may be the same or similar to the first tooth-like structures G1 in FIG. 8A, so reference can be made to the above related description of the first tooth-like structures G1 in FIG. 8A, which will not be described again here. The arrangement and number of the fourth tooth-like structures G4 in FIG. 10B may be the same or similar to the second tooth-like structures G2 in FIG. 9B, so reference can be made to the above related description of the second tooth-like structures G2 in FIG. 9B, which will not be described again here.

As shown in FIG. 6 and FIG. 10A with reference to FIG. 7, in the embodiment, the third leg 223 has a plurality of fifth tooth-like structures G5. The plurality of fifth tooth-like structures G5 are located around the axis A on a side of the third leg 223 facing the supporting bracket 110. In other words, the plurality of fifth tooth-like structures G5 are arranged radially relative to the axis A. The supporting bracket 110 has a plurality of sixth tooth-like structures G6. The plurality of sixth tooth-like structures G6 are located around the axis A on a side of the supporting bracket 110 facing the third leg 223 and engaged with the plurality of fifth tooth-like structures G5. In other words, the plurality of sixth tooth-like structures G6 are arranged radially relative to the axis A. By engaging the fifth tooth-like structures G5 of the third leg 223 and the sixth tooth-like structures G6 of the supporting bracket 110 with each other, the purpose of adjusting the rotational orientation between the supporting bracket 110 and the third leg 223 can be achieved. In addition, by passing the fixing member 130 sequentially through the first leg 221, the second leg 222, and the third leg 223 and being fixed to the supporting bracket 110, the third leg 223 and the supporting bracket 110 that have been adjusted can be fixed.

As shown in FIG. 6 and FIG. 10A, in the embodiment, the third leg 223 has a guiding block 223e. The structure of the guiding block 223e can be referred to the guiding block 221e in FIG. 8A and the above related descriptions, and will not be described in detail here. The supporting bracket 110 has a guiding groove 111a. The structure of the guiding groove 111a can be referred to the above related descriptions and will not be described again here. The guiding block 223e is slidably sleeved at an inner edge of the guiding groove 111a. In this way, the supporting bracket 110 and the third leg 223 can rotate relative to each other based on the axis A, so that the supporting bracket 110 and the third leg 223 can be pre-assembled before installing the fixing member 130.

As shown in FIG. 6 and FIG. 10A, in the embodiment, the fifth tooth-like structures G5 of the third leg 223 and the sixth tooth-like structures G6 of the supporting bracket 110 are protruding structures, but the disclosure is not limited thereto. In other embodiments, one set of the fifth tooth-like structures G5 and the sixth tooth-like structures G6 are protruding structures, another set of the fifth tooth-like structures G5 and the sixth tooth-like structures G6 are concave structures, and each of the protruding structures and a corresponding one of the concave structures can be engaged with each other in a matching manner.

In some embodiments, a central angle between any adjacent two of the fifth tooth-like structures G5 and a central angle between any adjacent two of the sixth tooth-like structures G6 relative to the axis A are about 10 degrees, but the disclosure is not limited thereto and can be flexibly adjusted according to actual needs.

Figure 10C:
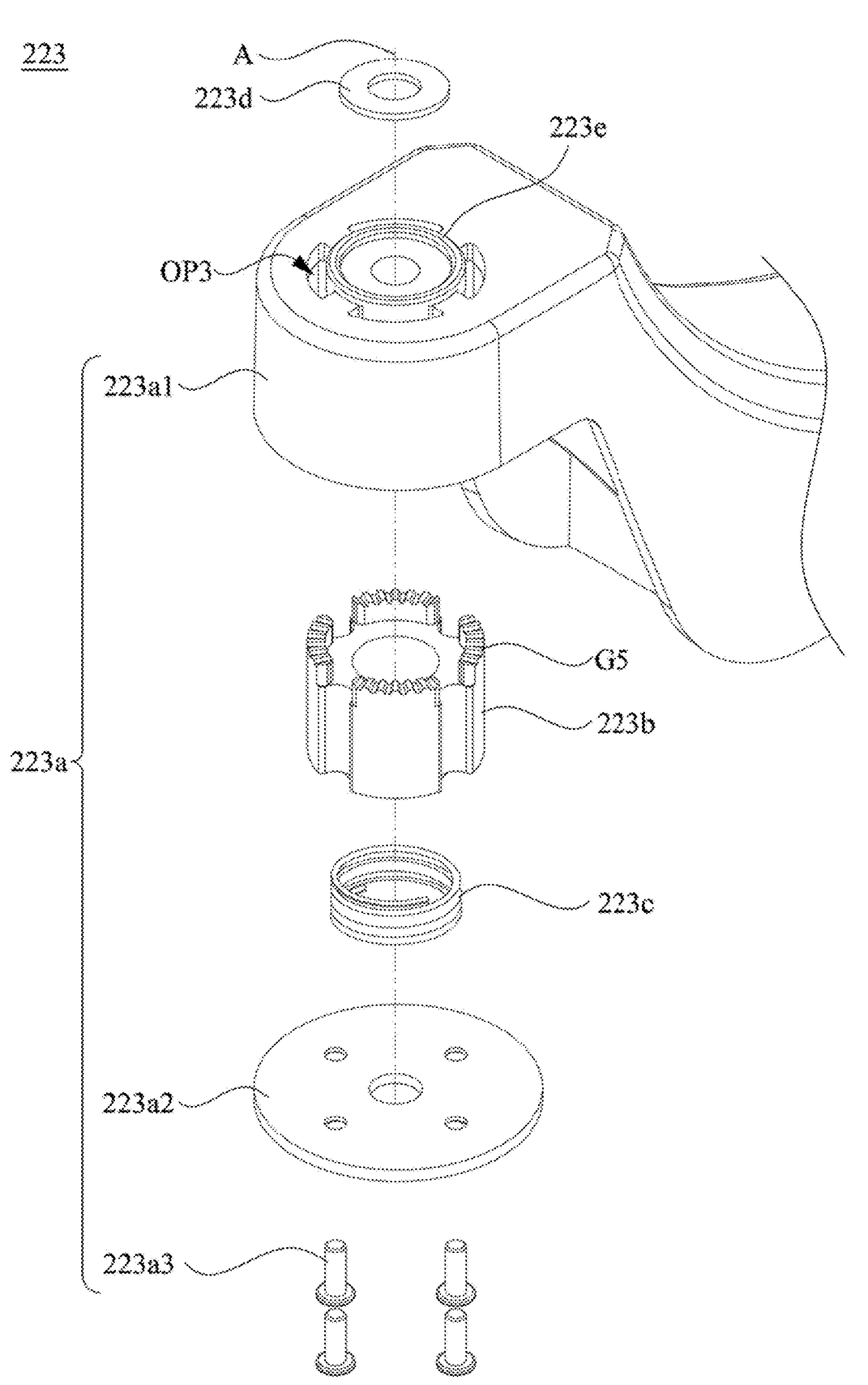
FIG. 10C is an exploded view of the third leg in FIG. 10A.

Furthermore, reference is made to FIG. 10C. FIG. 10C is an exploded view of the third leg 223 in FIG. 10A. As shown in FIG. 10C, in the embodiment, the third leg 223 includes a housing 223a, the sliding block 223b, and a resilient member 223c. The housing 223a has an accommodating space S3 (referred to FIG. 7) and an opening OP3 communicated with each other. The sliding block 223b is accommodated in the accommodating space S3 and configured to move along the axis A. The fifth tooth-like structures G5 are located at a side of the sliding block 223b adjacent to the opening OP3. The opening OP3 is configured for the fifth tooth-like structures G5 to pass out of the housing 223a. The resilient member 223c is accommodated in the accommodating space S3 and disposed at a side of the sliding block 223b away from the opening OP3. With the structural configurations, when the third leg 223 and the supporting bracket 110 rotate relative to each other based on the axis A, a sixth tooth-like structure G6 originally engaged in the recess between two of the fifth tooth-like structures G5 will press the fifth tooth-like structure G5 on one side and thus make the fifth tooth-like structures G5 sink into the opening OP3 without protruding out of the housing 223a. At this time, the sliding block 223b will move away from the opening OP3 and compress the resilient member 223c. After the sixth tooth-like structure G6 passes over the compressed fifth tooth-like structure G5, the resilient member 223c will elastically recover and push the sliding block 223b toward the opening OP3, which causes the fifth tooth-like structures G5 to reset and protrude out of the housing 223a through the opening OP3 and allows the sixth tooth-like structure G6 to engage with the next recess. In this way, the bracket device 200 of the embodiment can achieve the purpose of adjusting the rotational orientation between the third leg 223 and the supporting bracket 110 without loosening the fixing member 130.

As shown in FIG. 10C with reference to FIG. 7, in the embodiment, the housing 223a of the third leg 223 includes a main body 223a1, a cover 223a2, and a plurality of fixing members 223a3. The opening OP3 is located on one side of the main body 223a1. The other side of the main body 223a1 has a groove. The cover 223a2 covers the other side of the main body 223a1 to form the accommodation space S3 with the groove. The fixing members 223a3 are configured to fix the cover 223a2 to the main body 223a1. An outer edge of the sliding block 223b may correspondingly form clearance spaces for the fixing members 223a3 to pass. The clearance spaces extend along the axis A to the plurality of fifth tooth-like structures G5, so that the plurality of fifth tooth-like structures G5 are divided into a plurality of groups. Therefore, the overall volume of the third leg 223 can be effectively reduced. In practical applications, the clearance spaces do not extend to the plurality of fifth tooth-like structures G5, so as to be similar to the full number teeth configuration as shown by the embodiment in FIG. 5A.

As shown in FIG. 10C with reference to FIG. 7, in the embodiment, the third leg 223 further includes a buffer pad 223d. The buffer pad 223d is disposed at and in contact with the side of the third leg 223 facing the supporting bracket 110 and the side of the supporting bracket 110 facing the third leg 223. The buffer pad 223d can optimize the supporting stability and damping feeling when the third leg 223 and the supporting bracket 110 rotate relative to each other, and avoid the shaking problem of the bracket device 200 due to the tolerance gap between the third leg 223 and the supporting bracket 110.

It should be noted that the arrangement and number of the fifth tooth-like structures G5 in FIG. 10A may be the same or similar to the first tooth-like structures G1 in FIG. 8A, so reference can be made to the above related description of the first tooth-like structures G1 in FIG. 8A, which will not be described again here.

As shown in FIG. 1, in the embodiment, the included angles between any two of the first leg 121, the second leg 122, and the third leg 123 are substantially the same (i.e., any of the included angles is about 120 degrees) to be firmly supported on a flat surface, but the disclosure is not limited thereto.

Figure 11:
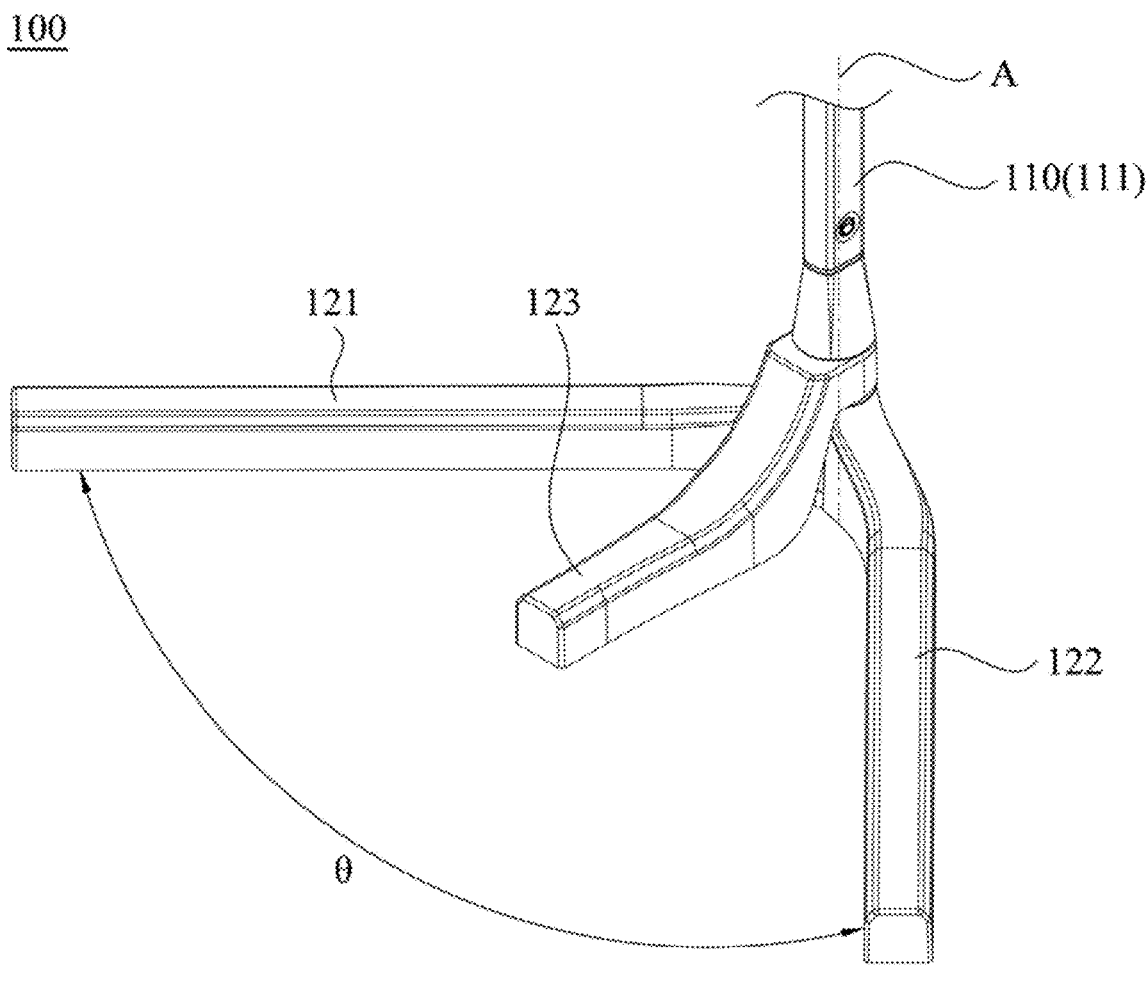
FIG. 11 is a partial perspective view of the bracket device in FIG. 1 according to another embodiment.

Reference is made to FIG. 11. FIG. 11 is a partial perspective view of the bracket device 100 in FIG. 1 according to another embodiment. As shown in FIG. 11, in the embodiment, the included angle θ between the first leg 121 and the second leg 122 is less than 180 degrees, and the third leg 123 is located within the included angle θ. In other words, the third leg 123 in FIG. 11 rotates about 180 degrees relative to the third leg 123 in FIG. 1. Therefore, the third leg 123 in FIG. 11 can be substantially aligned with the second extending segment 112 in FIG. 1 in a direction parallel to the axis A. It should be noted that when a weight is fixed on the second extending segment 112, the center of gravity of the weight on the plane will fall within the included angle θ between the first leg 121 and the second leg 122. By rotating the third leg 123 to within the included angle θ between the first leg 121 and the second leg 122, the supporting bracket 110 can be more effectively prevented from falling toward the included angle θ between the first leg 121 and the second leg 122 due to excessive weight.

According to the foregoing recitations of the embodiments of the disclosure, it can be seen that in the bracket device of the disclosure, by engaging the tooth-like structures between the legs, the purpose of adjusting the angles between the legs can be achieved. By passing the fixing member sequentially through the legs and fixing to the supporting bracket, the legs with the adjusted angle can be secured. By disposing the guiding block and the guiding groove that are slidably fitting each other between the legs or between the legs and the supporting bracket, pre-assembly between the legs or between the legs and the supporting bracket can be performed before installing the fixing member. In some embodiments, the tooth-like structures can be sunk into the housing of the leg under pressure, thereby achieving the purpose of adjusting the angle between the legs without loosening the fixing member. By disposing the buffer pad between the legs or between the legs and the supporting bracket, the supporting stability and damping feeling during rotation can be optimized, and the shaking problem of the bracket device caused by the tolerance gap between components can be avoided.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A bracket device, comprising:
a supporting bracket;
a leg assembly connected to the supporting bracket along an axis and comprising:
a first leg having a plurality of first tooth-like structures, the first tooth-like structures being located around the axis on a side of the first leg adjacent to the supporting bracket; and
a second leg disposed between the supporting bracket and the first leg and having a plurality of second tooth-like structures, the second tooth-like structures being located around the axis on a side of the second leg facing the first leg and being engaged with the first tooth-like structures; and a fixing member sequentially passing through the first leg and the second leg along the axis and fixed to the supporting bracket, wherein one of the first leg and the second leg has a guiding block, another of the first leg and the second leg has a guiding groove, and the guiding block is slidably sleeved at an inner edge of the guiding groove.

2. The bracket device of claim 1, wherein the first leg comprises:
a housing having an accommodating space and an opening communicated with each other;
a sliding block accommodated in the accommodating space and configured to move along the axis, wherein the first tooth-like structures are located at a side of the sliding block adjacent to the opening, and the opening is configured for the first tooth-like structures to pass out of the housing; and
a resilient member accommodated in the accommodating space and disposed at a side of the sliding block away from the opening.

3. The bracket device of claim 2, wherein the first leg further comprises a buffer pad, and the buffer pad is disposed at and in contact with the side of the first leg facing the supporting bracket and the side of the second leg facing the first leg.

4. A bracket device, comprising:
a supporting bracket;
a leg assembly connected to the supporting bracket along an axis and comprising:
a first leg having a plurality of first tooth-like structures, the first tooth-like structures being located around the axis on a side of the first leg adjacent to the supporting bracket; and
a second leg disposed between the supporting bracket and the first leg and having a plurality of second tooth-like structures, the second tooth-like structures being located around the axis on a side of the second leg facing the first leg and being engaged with the first tooth-like structures; and
a fixing member sequentially passing through the first leg and the second leg along the axis and fixed to the supporting bracket, wherein the second leg further has a plurality of third tooth-like structures, the third tooth-like structures are located around the axis on a side of the second leg facing the supporting bracket, the bracket device further comprises a third leg, the third leg is disposed between the supporting bracket and the second leg and has a plurality of fourth tooth-like structures, the fourth tooth-like structures are located around the axis on a side of the third leg facing the second leg and are engaged with the third tooth-like structures, and the fixing member sequentially passes through the first leg, the second leg, and the third leg and fixed to the supporting bracket.

5. The bracket device of claim 4, wherein one of the second leg and the third leg has a guiding block, another of the second leg and the third leg has a guiding groove, and the guiding block is slidably sleeved at an inner edge of the guiding groove.

6. The bracket device of claim 4, wherein the second leg comprises:
a housing having an accommodating space and an opening communicated with each other;
a sliding block accommodated in the accommodating space and configured to move along the axis, wherein the third tooth-like structures are located at a side of the sliding block adjacent to the opening, and the opening is configured for the third tooth-like structures to pass out of the housing; and a resilient member accommodated in the accommodating space and disposed at a side of the sliding block away from the opening.

7. The bracket device of claim 6, wherein the second leg further comprises a buffer pad, and the buffer pad is disposed at and in contact with the side of the second leg facing the supporting bracket and the side of the third leg facing the second leg.

8. The bracket device of claim 4, wherein the third leg further has a plurality of fifth tooth-like structures, the fifth tooth-like structures are located around the axis on a side of the third leg facing the supporting bracket, the supporting bracket has a plurality of sixth tooth-like structures, the sixth tooth-like structures are located around the axis on a side of the supporting bracket facing the third leg and engaged with the fifth tooth-like structures.

9. The bracket device of claim 8, wherein one of the third leg and the supporting bracket has a guiding block, another of the third leg and the supporting bracket has a guiding groove, and the guiding block is slidably sleeved at an inner edge of the guiding groove.

10. The bracket device of claim 8, wherein the third leg comprises:

a housing having an accommodating space and an opening communicated with each other;

a sliding block accommodated in the accommodating space and configured to move along the axis, wherein the fifth tooth-like structures are located at a side of the sliding block adjacent to the opening, and the opening is configured for the fifth tooth-like structures to pass out of the housing; and a resilient member accommodated in the accommodating space and disposed at a side of the sliding block away from the opening.

11. The bracket device of claim 10, wherein the third leg further comprises a buffer pad, and the buffer pad is disposed at and in contact with the side of the third leg facing the supporting bracket and the side of the supporting bracket facing the third leg.

12. The bracket device of claim 8, wherein at least one set of the first tooth-like structures, the second tooth-like structures, the third tooth-like structures, the fourth tooth-like structures, the fifth tooth-like structures, and the sixth tooth-like structures comprises a plurality of groups.

13. The bracket device of claim 4, wherein the first leg, the second leg, and the third leg extend away from the axis, one of the first leg, the second leg, and the third leg is located within an included angle between other two of the first leg, the second leg, and the third leg, and the included angle is less than 180 degrees.

14. The bracket device of claim 13, wherein the supporting bracket comprises:

a first extending segment extending along the axis, wherein the leg assembly is connected to an end of the first extending segment; and a second extending segment connected to another end of the first extending segment and extending away from the axis, wherein one of the first leg, the second leg, and the third leg is substantially aligned with the second extending segment in a direction parallel to the axis.

\* \* \* \* \*